(12) United States Patent
Curtis et al.

(10) Patent No.: US 9,309,462 B1
(45) Date of Patent: Apr. 12, 2016

(54) POLYMER-SURFACTANT COMPOSITION FOR SOIL AND METHOD OF USE

(75) Inventors: Michael A. Curtis, Glen Rock, NJ (US); John G. Thomas, Largo, FL (US)

(73) Assignee: Flo-Tec Automation Associates, Inc., Largo, FL (US)

( * ) Notice: Subject to any disclaimer, the term of this patent is extended or adjusted under 35 U.S.C. 154(b) by 776 days.

(21) Appl. No.: 13/156,670

(22) Filed: Jun. 9, 2011

Related U.S. Application Data

(60) Provisional application No. 61/352,933, filed on Jun. 9, 2010.

(51) Int. Cl.
*C09K 17/22* (2006.01)

(52) U.S. Cl.
CPC ........................ *C09K 17/22* (2013.01)

(58) Field of Classification Search
CPC ................................ C09K 17/22; E02D 19/14
USPC ...................... 405/264, 302.4, 302.6; 71/903; 106/900; 523/123
See application file for complete search history.

(56) References Cited

U.S. PATENT DOCUMENTS

| | | | |
|---|---|---|---|
| 3,880,643 A * | 4/1975 | Cooke et al. ................... | 504/186 |
| 5,303,663 A | 4/1994 | Salestrom | |
| 5,407,909 A * | 4/1995 | Goodhue et al. ............... | 507/118 |
| 5,649,495 A | 7/1997 | Salestrom | |
| 5,779,396 A * | 7/1998 | Mallon et al. .................. | 405/264 |
| 5,868,087 A | 2/1999 | Salestrom | |
| 6,183,732 B1 | 2/2001 | Salmon | |
| 6,460,290 B1 | 10/2002 | Moore et al. | |
| 6,846,793 B1 * | 1/2005 | Griese ............................ | 510/421 |
| 2004/0266656 A1 | 12/2004 | Sakurai | |
| 2005/0191265 A1 * | 9/2005 | Seigneurin et al. ......... | 424/70.16 |
| 2011/0015074 A1 * | 1/2011 | Seckinger ..................... | 504/288 |

FOREIGN PATENT DOCUMENTS

EP    2118252 B1    2/2014

OTHER PUBLICATIONS

Xu et al. (Journal of Pharmaceutical Sciences vol. 98, Issue 7, Published Nov. 13, 2008, pp. 2377-2389).*

Manzo (Dissertation, Water Conservation in Biofuels Development: Greenhouse and Field Crop Production with Biochar, Published 2009, pp. 62-63).*
SciFinder Scholar Data on Mazawet 36, accessed on Oct. 29, 2014, 2 pages.*
SciFinder Scholar data for Mazawet DF CAS No. 123210-92-4, accessed Jul. 23, 2015, 2 pages.*
SciFinder Scholar data for Mazawet DOSS CAS No. 577-11-7, accessed Jul. 23, 2015, 2 pages.*
Irrigaid Gold (accessed on Jul. 23, 2015 from http://www.aquatrols.com/agriculture/labels-and-msds/?LOCALE=USA#277, 1 page).*
SciFinder, CAS#72379-23-8 Mazawet 77, American Chemical Society (ACS), 2013.
SciFinder, CAS#865534-73-2 Polyquart Pro, American Chemical Society (ACS), 2013.
SciFinder, CAS#519163-30-5 Polyquart Ampho 149, American Chemical Society (ACS), 2013.
Technical Bulletin, Mazawet 77 Nonionic Surfactant, BASF Corporation, 2002.
Material Safety Data Sheet, Masurf 916M, Mason Chemical Company, 2009.
BASF website, Polyquart products data.
Tomadol Ethoxylated Alcohols Product Guide, Publication No. 110-10-002-US, Air Products and Chemicals, Inc., 2010.
SciFinder CAS No. 69726-15-4 (American Chem. Soc. 2015).
MASURF SP-1020 MSDS (Mason Chem. Co., Jun. 12, 2008).

* cited by examiner

*Primary Examiner* — Alma Pipic
(74) *Attorney, Agent, or Firm* — Robert J. Varkonyi; Smith & Hopen, P.A.

(57) ABSTRACT

A composition comprising an ampholytic copolymer or terpolymer and a non ionic surfactant is shown useful in soil treatment, especially moisture and nutrient retention. The highly surface active compositions described herein self-assemble onto root zone plant surfaces and near-root soil, forming a moisture barrier that still permits root growth and oxygen flow. The inventive compositions increases the wettability of the soil allowing the soil to better absorb water at the beneficial root zone, and release it, along with essential nutrients, to the plant root structure. By targeting moisture retention in the root zone, the polymer decreases the migration potential to the root zone, producing higher irrigation efficiency for optimal plant growth with lower treatment levels. Different dilutions of the composition determine the final settling location of the composition, and the formation of the barrier. The compositions may be applied through known means, such as an irrigation system.

11 Claims, 12 Drawing Sheets

POLYMER-SURFACTANT COMPOSITION FOR SOIL AND METHOD OF USE

CROSS REFERENCE TO RELATED APPLICATION

This application claims priority to U.S. Provisional Patent Application No. 61/352,933, entitled "Polymer-Surfactant Composition for Water Infiltration of Soil", filed on Jun. 9, 2010, the contents of which are herein incorporated by reference

FIELD OF INVENTION

This invention relates to a treatment composition to enhance root zone wetting, rewetting, moisture uniformity and moisture retention and availability in soil, particularly agricultural soils for the cultivation of plants.

BACKGROUND OF INVENTION

Since the advent of agriculture, crops have required a consistent supply of water for optimal growth and vegetative yield. Heavy clay soils have been shown to loose about 70% of trapped moisture through evaporation, while sandy soils loose 65% of moisture through gravitational leaching. To limit gravitation leaching, physical barriers, such as submerged asphalt or plastic sheets, have been used to retard leaching. While effective in reducing leaching, physical barriers also limit vegetative growth, due to physical constraints on the crops' root system. Additionally, physical barriers also introduce foreign materials that may exude materials into the soil, crops, and/or water table.

Issues with leaching extend beyond water loss, including loss of fertilizer chemicals. Leaching of fertilizers causes farmers to add extra chemicals, which washout into streams and ground water along with the leached fertilizer, before the chemicals may be used by the crops.

Currently, agriculture depends on simple soil wetting agents and surfactants that migrate through soil resulting in sub-optimal root zone moisture retention. Utilizing these wetting agents results in soil wetting that draws moisture through the soil, but does not concentrate in the root zone, resulting in sub-optimal moisture retention in the root zone, less efficient irrigation utilization and higher treatment/re-treatment levels. Other moisture retention materials and strategies include starches, perlite, absorbent pumice and mulches of various compositions. These materials and strategies, like the use of simple wetting agents, do not target moisture retention in the root zone.

Traditional soil surfactant technology employs simple APG technology that helps to move water throughout a soil area with no ability to add or support any moisture retention. The best result that can be expected by the current technology is that moisture introduced into dry soils can be moved with some limitations throughout the soil matrix for more even distribution of the said moisture. Water absorbent polymers have become more widely used to address water leaching. It is thought that the polymers act as water "banks" or "reservoirs" for use by the crops. For example, Salestrom (U.S. Pat. No. 5,303,663) uses water absorbant polymers tilled into the soil. Cordani (U.S. application Ser. No. 11/775,512) discloses water absorbent polymers that are sprayed onto soil to provide a water reservoir during drought and stressed, dry crops. Salestrom (U.S. Pat. No. 5,868,087) discloses an absorbent polymer that is tilled into the top six inches of soil, and swells with water to limit water travel through soil.

However, polymers can absorb about 200-400 times their weight, with recommended applications of 20 pounds per acre, providing a maximum water capacity of 4,000 pounds of water per acre, whereas an actively growing agricultural crop uses about 40,000 pounds of water per day. Polymer reservoirs were determined to constitute less than 2% of the retention in soil (Salestrom, U.S. Pat. No. 5,649,495). Conversely, six inches of saturated loam-type soil can hold about 400,000 pounds of water. As such, the goal of using polymers for water retention is flawed.

Accordingly, there continues to be a need for effective soil water management, including soil treatments that concentrate moisture in the root zone for maximizing plant growth while minimizing irrigation water consumption.

SUMMARY OF THE INVENTION

A long-felt need exists for an efficient, optimized system of soil treatment for targeted moisture retention. The highly surface active compositions described herein self-assemble onto root zone plant surfaces and near-root soil to increase the wettability of the root zone environment, and supports capillary flow by increasing the capillary flow adhesive forces of treated surfaces. The barrier formed by the compositions herein also permits root growth and oxygen flow. Simple detergent-based soil surfactants have no impact on surface adhesive forces, or for changing the wettability of the soil, and therefore have no lasting benefit. Further, the detergent-based surfactants continue to flow through the soil with rapidly diminishing effectiveness through dilution and flow to areas outside of the root zone. Self-hydrating mulches hold moisture but not necessarily in contact with the surviving root structure of the transplant, and like a sponge, may compete with the surviving root structure for moisture and transport of nutrients. The inventive compositions increases the wettability of the soil allowing the soil to better absorb water at the beneficial root zone, and release it, along with essential nutrients, to the plant root structure. By targeting moisture retention in the root zone, and effectively delivering a moisture retaining polymer with low migration potential to the root zone, higher irrigation efficiency can be realized for optimal plant growth benefit at lower treatment levels. The combined benefits from soil treatment using the inventive compositions reduces transplant stress and increases transplant stress tolerance by forming a protective shield of moisture and nutrient releasing hydration. By mimicking the pre-transplant biomass partitioning between roots and shoots through treatment with the inventive compositions, the transplant is better able to resist desiccation and respond quicker to the natural post-transplant environment.

The soil treatment compositions of the present invention include an ampholytic copolymer or terpolymer and a non ionic surfactant. The ampholytic polymer comprises at least two or three monomer subcomponents, depending of whether the copolymer or terpolymer is used, selected from monomer (a), (b), (c), and (d). Monomer (a) has the formula $H_2C=CR^1—CO—NH—R^2—N^+R^3R^4R''X^-$, where $R^1$ is H, an alkyl radical with 1 to 4 C atoms, or a methyl radical; $R^2$ is a linear or branched alkylene radical with 1 to 12 C atoms, or $CH_2—CH_2—CH_2$; $R^3$, $R^4$ and $R^5$ are each independently H, an alkyl radical with 1 to 18 C atoms, a phenyl radical, or a methyl radical; and X is an anion. Exemplary anions include halogen, sulfate, alkylsulfate, hydroxide, phosphate, acetate, formate ammonium, and hydrogen sulfate. Monomer (b), has the formula $H_2C=CR^6—CO—NR^7R^8$, where $R^6$ is hydrogen or an alkyl radical with 1 to 4 C atoms; $R^7$ and $R^8$ are each independently H, an alkyl radical with 1 to 4 C atoms or a C3-C6 cycloalkyl radical; and $R^7$ and $R^8$ do not simultaneously represent hydrogen. Monomer component (c) is an ethylenically unsaturated acid, such as acrylic acid, methacrylic acid, or a salt thereof. Monomer component (d) is a C3-C6 singly ethylenically unsaturated carboxylic acid, a half-ester of a C3-C6 singly ethylenically unsaturated carboxylic acid, a salt of a C3-C6 singly ethylenically unsaturated carboxylic acid, $H_2C=CR—CO—NH—CR'R''R'''—SO_3H$ or salts thereof, where R, R', R'', and R''' are each independently H or an alkyl(ene) radical with 1 to 4 C atoms. Exemplary monomer (d) compounds include crotonic acid, maleic acid, maleic anhydride, fumaric acid, itaconic acid, $H_2C=CR—CO—NH—CR'R''R'''—SO_3H$, half-esters thereof or salts thereof. The polymer is composed of a ratio of monomer components (a), (b) and (c) of about between 1:10:1 to 5:10:5, 4:10:1 to 4.10:3, or 3:8:2 to 3:8:1. Alternatively, the polymer is composed of a molar ratio between monomer components (a):(b):(c):(d) of about between 2:4:1:1 to 1:10:1:1, about 3:8:1:1, or 3:8:1:1. Specific examples of polymers that are useful in the invention include MASURF SP-1020 (a functionalized ampholytic polymer of ethanaminium, N,N,N-trimethyl-2-[(2-methyl-1-oxo-2-propen-1-yl)oxy]-, chloride, 2-propenamide and 2-propenoic acid, Mason Chemical Company, Arlington Heights, Ill.), POLYQUART AMPHO 149 (a polymer of sodium acrylate, ethylacrylate, and trimethylammoniopropylmethacrylamide, BASF SE, Monheim, Germany), POLYQUART PRO (a polymer of 2-acryloamido-2-methyl-1-propanesulfonic acid-acrylic acid-N-isopropylacrylamide-trimethyl(3-methacrylamido propyl)ammonium chloride, BASF SE, Monheim, Germany), MIRAPOL SURF S-210 (a copolymer of diallyl dimethyl ammonium acrylamide and acrylic acid, La Defense, France).

The composition also includes the aforementioned non-ionic surfactant. Examples include MASURF 916M (alcohols, C9-16, ethers with polyethylene glycol mono-Me ether, Mason Chemical Company, Arlington Heights, Ill.), TOMADOL (ethoxylated linear alcohols, Air Products and Chemicals, Inc., Allentown, Pa.). Additionally, the composition may include a wetting agent in addition to the non-ionic surfactant.

In specific embodiments of the invention, the composition includes two active ingredients, MASURF SP-1020 (a functionalized ampholytic polymer of ethanaminium, N,N,N-trimethyl-2-[(2-methyl-1-oxo-2-propen-1-yl)oxy]-, chloride, 2-propenamide and 2-propenoic acid, Mason Chemical Company, Arlington Heights, Ill.) and MASURF 916M (alcohols, C9-16, ethers with polyethylene glycol mono-Me ether, Mason Chemical Company, Arlington Heights, Ill.). The active ingredients are optionally combined at 1 part MASURF SP-1020 (a functionalized ampholytic polymer, Mason Chemical Company, Arlington Heights, Ill.) to 1.424 parts of MASURF 916M (alcohols, C9-16, ethers with polyethylene glycol mono-Me ether, Mason Chemical Company, Arlington Heights, Ill.).

The composition is especially useful in treating soil. Soil treatment comprises applying the composition to soil. Exemplary application is through an irrigation system. While the composition is useful at most concentrations, it was found especially useful is applied at between ½ gallon to the acre and 1½ gallon to the acre, including especially ¾ gallon to the acre and 1 gallon to the acre. Further, running the composition through the irrigation system for about 45 minutes, followed by running clean water through the irrigation system for about 30 minutes afterwards was found especially useful. However, it is noted that other applications, and other timing, may be used with good results. For example, diluting the composition at 1 gal to 1450 gal to 1 gal to 500 gal, and drenching the soil with the diluted composition; or diluting 1 ounce of the composition in one gallon or water or 2 ounces of composition in one gallon of water and applying the diluted composition to a root ball of a plant or containered plant.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
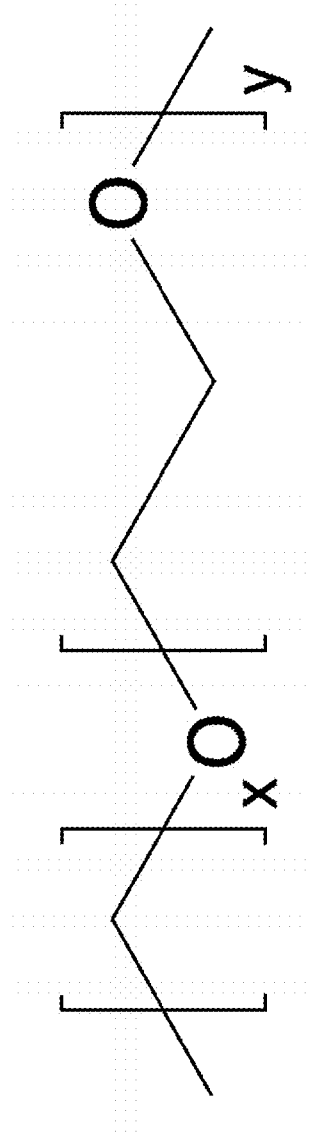
FIG. 1 is an illustration of Masurf 916M surfactant (alcohols, C9-16, ethers with polyethylene glycol mono-Me ether, Mason Chemical Company, Arlington Heights, Ill.).

The present invention is directed to soil additive compositions comprising a formulated combination of an ampholytic polymer and a non-ionic surfactant designed to settle at a specific depth in the soil and provide soil moisture and fertilizer retention. The ampholytic polymer is a moisture retaining polymer that has low mobility in soil, with a surfactant that acts to carry the moisture retaining polymer to the desired root zone soil area.

The new invention improves the moisture retention ability of soil, at the key root zone, through the positioning of ampholytic polymers at the root zone, carried to the root zone by optimized wetting agent/surfactant products. The wetting agent/surfactant products in the inventive composition impart rapid dynamic surface tension reduction in both hydrophilic and hydrophobic soils, are non-toxic and biodegradable, and fully compatible with the moisture retaining the ampholytic polymer for transport to the root zone. The moisture retaining polymer bonds with the soil imparting the ability to retain the moisture by way of establishing a hydrophilic polymer/soil matrix and through localized hydrogen bonding interactions, allowing moisture and nutrient availability for optimal plant growth benefit. The results of the above described technology have been demonstrated in field tests that show the inventive technology maintains moisture longer by not less than 25% than current technology, and maintains that moisture higher in the soil column which is where most plants can utilize this moisture more effectively The polymer component of the inventive composition is an "ampholytic" polymer optimized for moisture retention (hydrophilic) properties. Polymers can be classified in the same way as surfactants with respect to anionic, cationic, nonionic and ampholytic structure. The structure is an important aspect in surface modification. Nonionic and anionic polymers do not provide long-lasting effects because soil surfaces and matrices are normally negatively charged and thus the affinity of those polymers is very low. Cationic polymers show affinity to soil surfaces and matrices, but are limited in use due to incompatibility with many other ingredients important to plant nutrition and may negatively impact plant growth processes. Polymers with ampholytic structure possess both anionic and cationic functionality. The cationic functional structure of the polymer is responsible for the adhesion of the polymer in the soil matrix and hence provides the long-lasting effect, the nonionic and anionic functional structures, which are oriented toward the environment, influence the moisture retention (hydrophilicity) of the modified soil matrix.

As used herein, "about" means approximately or nearly and in the context of a numerical value or range set forth means±15% of the numerical.

As used herein, ""ampholytic" refers to a structural characteristic, being a single substance, such as a compound, or a mixture of substances, such as a mixture of two or more compounds, comprising charged groups of both anionic and cationic character. The ampholytic polymers are water-soluble, i.e., at least 0.1 g of the polymer is soluble in 100 ml water at 20° C.; and are ampholytic, meaning the polymers have both acid and basic hydrophilic groups and show acidic or basic behavior depending on the conditions.

As used herein, "drainage channel" means voids or spaces between adjacent soil particles, such that the voids or spaces are interconnected to form channels, conduits, etc., which allow for flow of water through the channels, etc. through the soil. The rate at which water flows through the channels, etc. depends on the size and diameter of the channels, and varies based on the composition of the coil.

As used herein, "irrigation efficiency" means the need for irrigation the benefits derived from irrigation. For example increasing the irrigation efficiency may encompass fewer irrigation cycles or a lower water requirement in each cycle to maintain healthy crops. It would also include increasing the benefits obtained from an irrigation cycle, such as increased overall crop health in situations that would normally produced stressed crops.

As used herein, "self-assembling" means the capability to migrate to a desired or pre-determined location or area in the soil, wherein a user does not directly cause the migration within the soil. As an example, the composition of ampholytic polymer and non-ionic surfactant is mixed with a determined amount of an aqueous solution, forming a suspension or colloidal dispersion, being applied to soil is capable of settling at a desired level in the soil, based on the dilution factor of the composition of ampholytic polymer and non-ionic surfactant.

The polymers used herein are water-soluble, ampholytic comprised of copolymers, i.e. polymers produced by polymerization of at least two different monomers, or terpolymers, i.e. polymers produced by polymerization of at least three different monomers. The ampholytic polymer is a copolymer of monomers from acid functional monomers, aminofunctional monomers, and optionally other "nonionic" monomers. The acid monomers may be in free acid or partially or fully neutralized form. The aminofunctional monomers may be quarternized or they may be partially or fully neutralized. And there can be any combination of these. The monomers fitting these descriptions are numerous and commercially available. Where the polymers are terpolymers, the terpolymers are copolymers produced by polymerization of at least three different monomers, provided below. The polymer includes monomer components (a) and (b), and may include any combination of the monomer components (c) and (d), provided that at least three components are used in combination.

Monomer component (a) having the following the general formula:

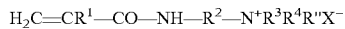

$$H_2C=CR^1-CO-NH-R^2-N^+R^3R^4R''X^-$$

wherein $R^1$ represents a hydrogen atom or an alkyl radical with 1 to 4 C atoms, $R^2$ represents a linear or branched alkylene radical with 1 to 12 C atoms and $R^3$, $R^4$ and $R^5$ independently of one another represent a hydrogen atom, an alkyl radical with 1 to 18 C atoms, or a phenyl radical, and X represents an anion from the group of halogens, sulfates or alkylsulfates, hydroxide, phosphate, acetate, formate or ammonium. Particularly preferred are monomers of type a) in which $R^1$ represents a methyl radical, $R^2$ represents a $CH_2-CH_2-CH_2$ group, and the radicals $R^3$, $R^4$ and $R^5$ each represent a methyl radical. $X^-$ represents a suitable counter-ion such as halide, hydroxide, sulfate, hydrogen sulfate, phosphate, formate or acetate, preferably chloride. The monomer, 3-trimethylammoniumpropylmethacrylamide chloride (MAPTAC), is particularly preferred.

Monomer component (b), a nitrogen-containing, ethylenically unsaturated compound having following general formula:

$$H_2C=CR^6-CO-NR^7R^8$$

wherein $R^6$ represents a hydrogen atom or an alkyl radical with 1 to 4 C atoms and $R^7$ and $R^8$, independently of one another, each represent a hydrogen atom, an alkyl radical with 1 to 4 C atoms or a C3-C6 cycloalkyl radical, with the specification that $R^7$ and $R^8$ do not simultaneously represent hydrogen. Monomer b) encompasses the acrylamides. Particularly preferred is N-isopropylacrylamide, also known under the abbreviation NIPAM.

Monomer component (c), an ethylenically unsaturated acid and their salts such as acrylic or methacrylic acid are suitable. Acrylic acid (AA) is a particularly preferred monomer here. Particularly suitable salts are alkali metal and ammonium salts.

Monomer component (d) are selected from the group of the C3-C6 singly ethylenically unsaturated carboxylic acids such as crotonic acid, maleic acid, maleic anhydride, fumaric acid, itaconic acid, and their half-esters and salts or $H_2C=CR-CO-NH-CR'R''-CR'R''SO_3H$ and salts thereof, especially the alkali metal and ammonium salts, wherein R, R', R'', and R''' independently of one another represent a hydrogen atom or an alkyl(ene) radical with 1 to 4 C atoms. Particularly preferred here as the monomer building block of type d) is the molecule with the general formula or $H_2C=CR-CO-NH-CR'R''-CR'R''SO_3H$, wherein especially a derivative, 2-acrylamido-2-methylpropane-sulfonic acid (AMPS) is suitable.

Additional monomer building blocks may be present in the polymers in accordance with the invention in addition to the aforementioned a) to d), wherein here especially nitrogen-containing monomers are preferred. Examples are dimethyldiallyl ammonium chloride (DADMAC), 2-dimethylaminoethyl(meth)acrylate (DMAE(M)A), 2-diethylamino-ethyl(meth)acrylate, 3-dimethylaminopropyl(meth)acrylamide (DMAP(M)A), 3-dimethyl-amino-2,2-dimethylpropylacrylamide (DMADMPA), and the derivatives thereof, which can be obtained by protonation or quaternization, especially 2-trimethyl-ammoniumethyl(meth)acrylate chloride and 3-diethylmethylammoniumpropyl-acrylamide chloride.

The various monomer building blocks (a) to (d) preferably occur in certain selected quantitative ratios along with one another. Preferred in each case are polymers that contain the component (b) in excess (both on a molar basis and based on the weight of the components) relative to the components (a) and (c). Exemplary ratios include polymers in which the molar ratio between the monomers (a), (b) and (c) is in the range from 1:10:1 to 5:10:5 and preferably in the range from 4:10:1 to 4.10:3 and especially in the range form 3:8:2 to 3:8:1. Specific embodiments use polymers in which the molar ratio between the components a) and (b) is 1:10 to 1:1 and especially 1:5 to 1:1.

Based on mol-% of the respective monomers, certain embodiments of the invention use 20 to 30% of monomer (a), 50 to 70% of monomer (b) and 10 to 20% of monomer (c). As long as the monomer building block of type (d) is present instead of the component (c), the same relationships apply analogously. Particularly useful polymers contain both monomers of type (c) and type (d) together. The monomer building blocks (c) and (d) may be present simultaneously in a molar ratio of 2:1 to 1:2, but particularly in a 1:1 ratio. Exemplary polymers with four different monomer building blocks have molar ratios (a):(b):(c):(d) of 2:4:1:1 to 1:10:1:1, such as a ratio is 3:8:1:1.

Exemplary polymers in particular are those in which the monomer (a) is selected from compounds of the general formula in which R' represents a methyl group, $R^2$ represents an alkylene radical with 3 C atoms, $R^3$, $R^4$ and $R^5$ respectively represent methyl radicals and X represents chloride, the monomer (b) is selected from compounds of the general formula in which $R^6$ and $R^7$ represent hydrogen atoms and $R^8$ represents an isopropyl radical, and monomer (c) represents 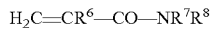 $H_2C=CR-CO-NH-CR'R''R'''-SO_3H$ and its salts, especially the alkali metal and ammonium salts, wherein R, R', R'', and R''' independently of one another represent a hydrogen atom or an alkyl(ene) radical with 1 to 4 C atoms.

The polymer employed in the present invention possesses self-equilibrating properties to the natural ionic balance of any soil composition while maintaining full hydration capacity. Suitable polymers are commercially available, marketed under the brand POLYQUART AMPHO 149, comprising a combination of sodium acrylate, ethylacrylate, and trimethylammoniopropylmethacrylamide; and POLYQUART PRO, comprising a combination of acrylic acid, 2-acryloamido-2-methyl-1-propanesulfonic acid, methacrylamido propyl trimethyl ammonium chloride, and sopropyl acrylamide; by Cognis (BASF SE, Monheim, Germany); MIRAPOL SURF S-210 by Rhodia, SA, comprising a copolymer of diallyl dimethyl ammonium acrylamide acrylic acid (La Defense, France), and MERQUAT 3330, comprising a combination of acrylic acid and dimethyldiallylammonium chloride and acrylamide; MERQUAT 280 and MERQUAT 295, comprising a combination of acrylic acid and diallyldimethylammonium chloride; and MERQUAT 2001, comprising a combination of acrylic acid, methacrylamido propyl trimethyl ammonium chloride, and methyl methacrylate; (Nalco Co., Naperville, Ill.).

A composition described herein is optionally prepared using MASURF SP-1020 (Mason Chemical Company, Arlington Heights, Ill.), an ampholytic polymer formed from ethanaminium, N,N,N-trimethyl-2-[(2-methyl-1-oxo-2-propen-1-yl)oxy]-, chloride, 2-propenamide and 2-propenoic acid, having a specific gravity at 20° C. of 1.04±0.04 g/ml, a weight of 8.8 lb/gal, boiling point of 100° C., and classified under EU Classification R-36/38, S36, and which is also a component in Masurf SP-925. Masurf SP-1020 (a functionalized ampholytic polymer, Mason Chemical Company, Arlington Heights, Ill.) is a stable material with no identified degradation products. Physical properties include Boiling Point >185° C. (with decomposition), a water solubility >442 g/L at 23° C., partition coefficient (n-octanol/water) log Pow ≤−3.7 at 23° C., Dissociation Constant pKa=4.4 at 20° C. MASURF SP-1020 (Mason Chemical Company, Arlington Heights, Ill.) is a functionalized ampholytic polymer designed to impart surface protectant and soil resistance and release properties to treated surfaces. Based on the high molecular weight of this material, oral toxicity is expected to be low, not mutagenic, and with low absorption across biological membranes the systemic toxicity is expected to be low. Due to strong binding properties in soil, the polymer is not mobile and will eventually degrade by abiotic and biotic processes to form simple carbon and nitrogen-based compounds.

The soil additive also comprises one or more suitable surfactants. Being a moisture retaining polymer, and not a grease cutting surfactant, the potential for surface active interference is essentially eliminated, insuring that the natural biotic environment is not altered. Allowing for, and maintaining soil hydration without the introduced ionic substances and detrimental surface active effects, enhanced nutrient transport for plant growth is achieved. The surfactant may be used to facilitate infiltration of the composition into the soil, especially where there is a water repellant or hydrophobic soil layer. Hydrophobic soil tends to redirect water to drainage channels, which leads the water through the hydrophobic layer and decreases uniform wetting of soil beneath the hydrophobic layer and/or prevents formation of a uniform layer of the inventive composition. The surfactant component of the inventive composition is a modified nonionic surfactant optimized for fast (dynamic) wetting of surfaces, and aids in transporting the ampholytic polymer optimally to the root zone. Surfactants useful in the present invention include nonionic surfactants, such as MASURF 916M (Mason Chemical Company, Arlington Heights, Ill.), a composition of alcohols, C9-16, ethers with polyethylene glycol mono-Me ether, TOMADOL, a composition of ethoxylated alcohols, by Air Products and Chemicals, Inc. (Allentown, Pa.). An exemplary surfactant is MASURF 916M (alcohols, C9-16, ethers with polyethylene glycol mono-Me ether, Mason Chemical Company, Arlington Heights, Ill.), a modified nonionic polymer having a specific gravity at 25° C. of 0.96±0.04, a surface tension at 25° C. of 28 dynes/cm at 0.1%, 32 dynes/cm at 0.01%, and a structure shown in FIG. 1. MASURF SP-1020 (a functionalized ampholytic polymer, Mason Chemical Company, Arlington Heights, Ill.) creates a strongly hydrophilic and highly effective invisible soil barrier over the pH range <1 to 14. There is a universe of surfactants, including nonionic surfactants. Nonionic surfactants are preferred in the inventive composition for compatibility with the ampholytic polymer, reduced capacity for binding in soil matrices and interference with plant growth processes. Because the surfactant is non-ionic, it is optimized to interact with the polymer, facilitating optimal wetting and penetrating, and thus impacting both surface tension and contact angle that transports the highly efficient self-assembling nano-composite polymer to the root zone.

The optimum biotic environment for nutrient transport supporting plant growth is achieved through a complex balance of soil hydration and osmotic flow moderated through ionic content, and hydrophilic/hydrophobic balance in the natural biotic environment. Prior art surfactants employed as soil wetting agents can be viewed analogously as detergents used to wash clothes or pots and pans. Detergents may "cut grease" and clearly function as wetting agents, pulling water through hydrophobic soil, but this is done without regard for the soil's natural balances. Unlike the ampholytic polymer employed in the present invention, these common surfactants may have unintended detrimental effects in the plant's biotic environment. Ionic surfactants, either anionic or cationic, necessarily alter the ionic content of the soil, and including nonionic surfactants are by definition "Surface Active," altering the balance in cellular activities relating to plant growth, osmotic flow, membrane function, fertilizer uptake, nitrogen fixation and the biotic environment in general.

The infiltration of water into soil can often be made possible and improved by applying a simple wetting agent. Wetting agents are detergent-like substances that reduce the surface tension of water, which allow water to penetrate and wet soil more easily. The use of simple soil wetting agents can improve the rewetting of dry spots, and increase infiltration or percolation rates of root zones in rapidly drying soils.

The composition may further comprise any combination of synthetic polymer or natural polymer having an ampholytic structure, and any non-ionic surfactant. The soil additives of the present invention can be utilized in any suitable form, including dry particulate and gel, though typically suspended or colloidally dispersed in an aqueous solution.

The compositions of ampholytic polymer and non-ionic surfactant help retain water, nutrients, and fertilizer in soil at a predetermined depth, typically just under the plant root zone. The depth at which the composition will settle is typically less than 1 foot below the surface for drip irrigation and varies based on the dilution factor of the composition in an aqueous carrier. The composition settling location also depends on factors such as soil moisture content, soil texture, soil structure, soil composition, including organic material, and agricultural application. Although different soil makeups can affect the penetration the below information is a good guide for most typical soil conditions. Lateral movement is also affected by dilutions ratios, and they are noted in second column of Table 1. Dilutions for use in tank mixing and drenching are shown in Table 2.

TABLE 1

Quantity of composition to add to row crops grown under plastic mulch injected thru irrigation system.

|  | Penetration depth | lateral movement |
|---|---|---|
| ½ gallon to the acre | 5 to 6" | 7" dia |
| ¾ gallon to the acre | 6 to 8" | 9" dia |
| 1 gallon to the acre | 8 to 10" | 10 to 11" dia |

TABLE 2

Quantity of composition to add for tank mixing and drenching plant beds without plastic mulch using irrigation system.

| | Application method |
|---|---|
| 1 gal to 1450 gal | water drenching entire width/top of bed |
| 1 gal to 500 gal | water drench center 6" of bed |

Once the composition settles in the soil, repeat fertilizer and water events, without the inventive composition, will only penetrate to the depth that the original treatment. Testing with 30 plus fertilizer/water events after application the inventive composition shows the composition retains its performance.

The slowing down of drainage flow using the composition and methods described herein can reduce water loss, provide increased water for plant usage, increase water usage efficiency, enhance water distribution, improve nutrient availability in the soil, reduce fertilizer needs for crops, and enhance fertilizer usage. Compared to current methods of using large amounts of suprabsorbant polymer compositions technology that helps to move water throughout a soil area with no ability to add or support any moisture retention, the present compositions provide effective use through a small amount of polymer-surfactant composition. The highly surface active nano-composite composition described herein self-assembles onto subsurface soil to increase the hydrophilic nature of the soil at the root zone, increasing capillary flow by changing the contact angle through adhesive forces. Simple detergent-based soil surfactants have no impact on the adhesive forces, or wettability of the soil, and have no lasting benefit. Simple detergent-based materials continue to flow through the soil with rapidly diminishing effectiveness through dilution and flow to areas outside of the root zone. The composition is effective at maintaining optimum moisture and nutrient levels, resulting in dramatically improved yield consistency, providing a uniform distribution of moisture in soil while facilitating plant nutrient transfer and uptake. Due to the high efficiency of the composition, the composition provides cost-effective means of enhancing soil, without the need for additional manipulation of the soil, such as tilling and seed drilling. Further, the leaching of the polymer is kept to a minimum due to the polymer size.

The inventive composition provides a uniform distribution of moisture by improving the irrigation efficiency of mixed soil types, through both improved distribution uniformity, i.e. the measure of how uniformly water is applied to the area being watered, and improved field capacity, i.e. the volume of water, or bulk water content, the maximum moisture a soil can hold in its pores after excess water has been drained away. The inventive composition improves soil water and nutrient retention through enhanced capillary flow in both hydrophobic and mixed hydrophobic soils, allowing these soil types to hold water uniformly, and improves field capacity by increasing the water-holding capacity of the soil, without over-saturating naturally hydrophilic soils. The composition also facilitates nutrient transfer and uptake of the uniformly hydrated soil through an optimized polymer system. The polymer system in the composition possesses a self-assembling structure that self-equilibrates to the natural ionic balance of any soil composition while maintaining full hydration capacity for hydration uniformity. By self-equilibrating to the natural ionic balance of the treated soil, the self-assembling nano-composite polymer dose not bind or otherwise interfere with the ionic charge moderated plant uptake of nutrients. Readily biodegradable soil surfactants deliver the polymer system to the beneficial root zone for optimal treatment.

Example 1

Figure 2:
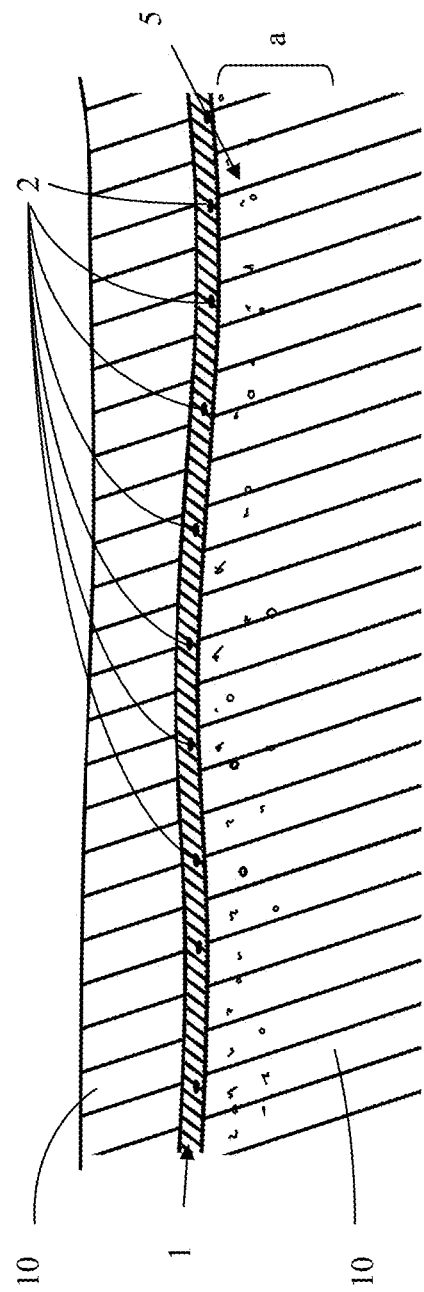
FIG. 2 is an illustration of the composition being delivered via a drip irrigation system.

The composition of ampholytic polymer and non-ionic surfactant was prepared as a concentrate using 1 part MASURF SP-1020 (a functionalized ampholytic polymer, Mason Chemical Company, Arlington Heights, Ill.) to 1.424 parts of MASURF 916M (alcohols, C9-16, ethers with polyethylene glycol mono-Me ether, Mason Chemical Company, Arlington Heights, Ill.). Concentrate compositions made include inert components. For example water is optionally added at a blend of 83% Water, 10% Masurf 916M (alcohols, C9-16, ethers with polyethylene glycol mono-Me ether, Mason Chemical Company, Arlington Heights, Ill.), 7% SP-1020 (a functionalized ampholytic polymer, Mason Chemical Company, Arlington Heights, Ill.), which may then be further diluted prior to application. The composition was added to drip irrigation water at ½ gallon to ¾ gallon to 120-125 gallons of water for every acre of soil. The composition was then applied to the soil using drip irrigation, as seen in FIG. 2. Drip irrigation line 1 carried soil retention composition 5 until the soil retention composition exited drip irrigation line 1 via drip irrigation port 2. The soil retention composition traveled through soil 10 to the predetermined composition settling location a, which is determined based on the soil and composition dilution factor, discussed above.

Figure 3:
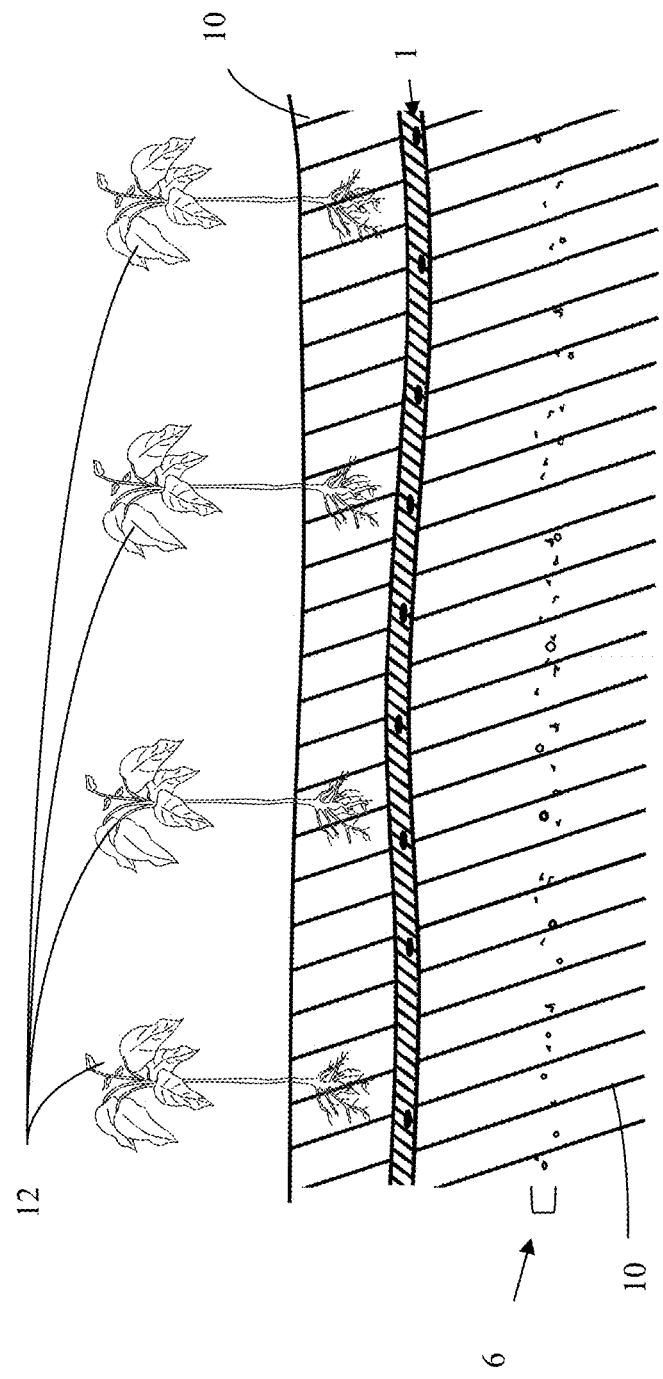
FIG. 3 is an illustration of the composition forming a retention barrier in the soil, within the root zone of a crop.
Figure 4:
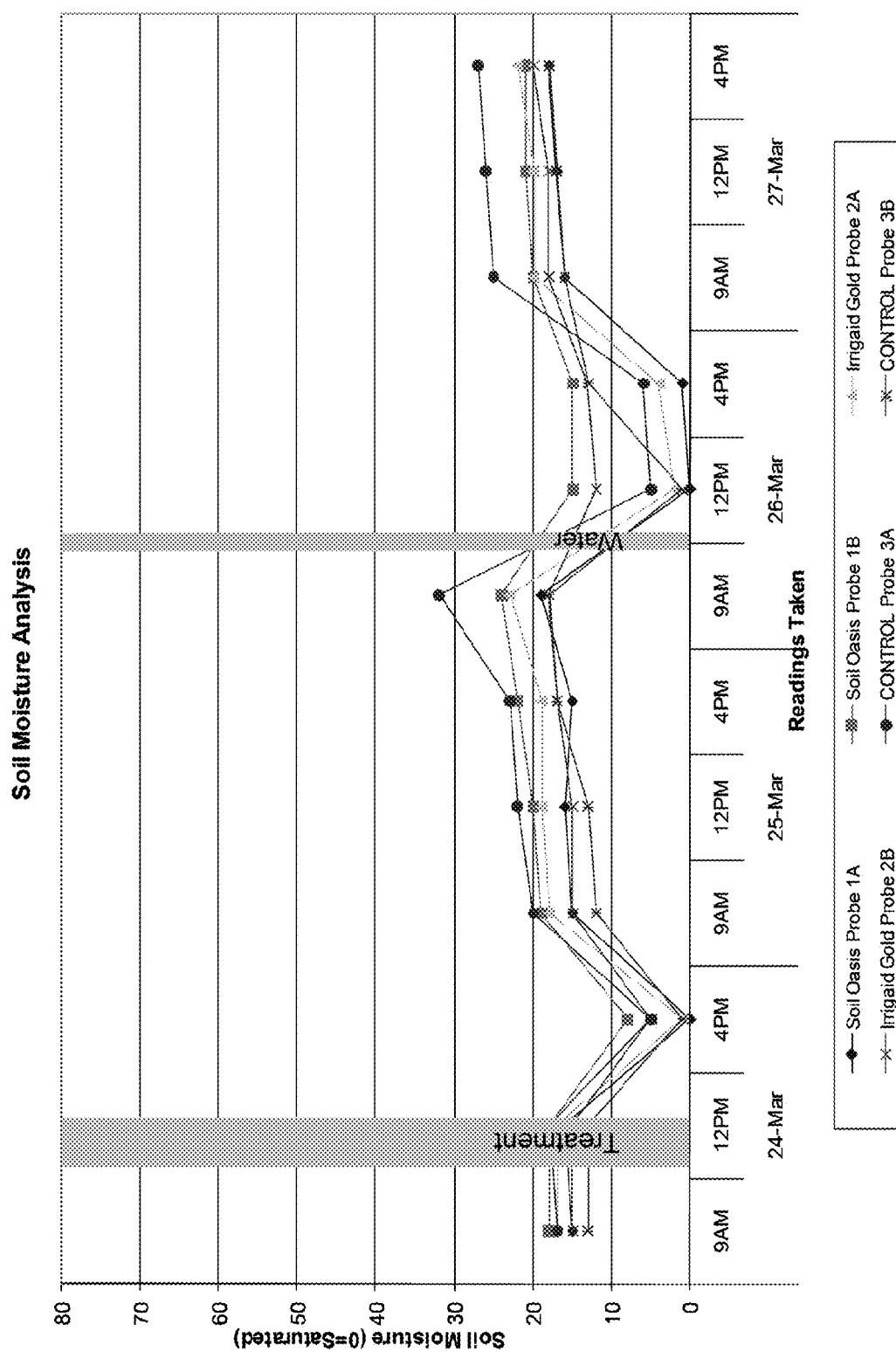
FIG. 4 is a soil moisture analysis graphs showing soil moisture as a function of time for the first few days after application of the soil treatments. An embodiment of the present invention is designated under an internal brand identifier of "SOIL OASIS." Moisture readings were taken at 3" deep (♦) and 9" deep (■). IRRIGAID GOLD (a composition of alkoxylated polyols, glucoethers, and water, Aquatrols, Paulsboro, N.J.) was compared, with readings also at 3" deep (▲) and 9" deep (x). A water only control was used with readings at 3" deep (●) and 9" deep (*).

At the settling location a, the ampholytic polymer in soil retention composition 5 bonds with the soil, forming moisture barrier 6, seen in FIG. 3. Moisture barrier 6 imparts rapid dynamic surface tension reduction in both hydrophilic and hydrophobic soils through establishment of a hydrophilic polymer/soil matrix and through localized hydrogen bonding interactions. This allows moisture and nutrient availability for optimal plant growth benefit.

Six Watermark Model #200SS probes (Irrometer Co., Inc., Riverside, Calif.), designated Probes 1A through 3B were positioned as follows; "A" probes were positioned at 3" below the surface while "B" probes were at 9" below the surface. The probes were used to measure soil moisture tension to indicate soil moisture levels. Soil moisture tension refers to how strongly water is held on soil particles; the higher the tension the more difficult it is for plant roots to extract water from the soil. Therefore, low soil moisture tension indicates moist soil and high soil moisture tension indicates dry soil. Soil moisture tension is expressed in centibars. Integer reading recorded by the probes are in centibars 0-199 (0=saturated).

Hibiscus standards were planted in a field and the composition of the present invention (branded as SOIL OASIS) was added to the soil of one plant. A commercially available product branded IRRIGAID GOLD (a composition of alkoxylated polyols, glucoethers, and water, Aquatrols, Paulsboro, N.J.) was added to a second plant for comparison and a control, constituting only water, was added to the third. Readings from the probes was taken at regular intervals, as indicated in Tables 3-7, below. As seen in the tables, the efficacy of SOIL OASIS is shown by its ability to retain moisture in the upper root zone (as indicted by the lower centibar readings of the upper sensor) thereby making the moisture available to a broader cross-section of the root zone.

TABLE 3

Relative moisture content in soil from 3 inches or 9 inches below the soil surface after indicated treatment.

| | | Soil Oasis | | Irrigaid Gold | | Control | |
|---|---|---|---|---|---|---|---|
| Date | Time | Probe 1A | Probe 1B | Probe 2A | Probe 2B | Probe 3A | Probe 3B |
| 24-Mar | 9AM | 15 | 18 | 17 | 15 | 17 | 13 |
| | 12PM | 16 | 18 | 17 | 15 | 18 | 13 |
| | 4PM | 0 | 8 | 1 | 5 | 5 | 1 |
| 25-Mar | 9AM | 15 | 19 | 18 | 15 | 20 | 12 |
| | 12PM | 16 | 20 | 19 | 15 | 22 | 13 |
| | 4PM | 15 | 22 | 19 | 17 | 23 | 17 |
| 26-Mar | 9AM | 19 | 24 | 23 | 18 | 32 | 18 |
| | 12PM | 0 | 15 | 2 | 12 | 5 | 21 |
| | 4PM | 1 | 15 | 4 | 13 | 6 | 22 |
| 27-Mar | 9AM | 16 | 20 | 20 | 18 | 25 | 20 |
| | 12PM | 17 | 21 | 20 | 18 | 26 | 27 |
| | 4PM | 18 | 21 | 22 | 20 | 27 | 18 |
| 30-Mar | 9AM | 12 | 25 | 15 | 16 | 17 | 16 |
| | 12PM | 12 | 25 | 16 | 17 | 18 | 16 |
| | 4PM | 13 | 25 | 17 | 18 | 19 | 19 |
| 31-Mar | 9AM | 16 | 26 | 20 | 20 | 26 | 23 |
| | 12PM | 1 | 8 | 6 | 11 | 7 | 8 |
| | 4PM | 6 | 13 | 13 | 17 | 19 | 15 |
| 1-Apr | 9AM | 15 | 18 | 18 | 19 | 25 | 17 |
| | 12PM | 15 | 19 | 19 | 20 | 26 | 19 |
| | 4PM | 15 | 19 | 20 | 22 | 26 | 22 |
| 2-Apr | 9AM | 17 | 23 | 24 | 24 | 36 | 36 |
| | 12PM | 9 | 8 | 4 | 17 | 16 | 9 |
| | 4PM | 11 | 13 | 15 | 18 | 19 | 16 |

TABLE 4

Relative moisture content in soil from 3 inches or 9 inches below the soil surface after indicated treatment.

| | | Soil Oasis | | Irrigaid Gold | | Control | |
|---|---|---|---|---|---|---|---|
| Date | Time | Probe 1A | Probe 1B | Probe 2A | Probe 2B | Probe 3A | Probe 3B |
| 3-Apr | 9AM | 0 | 0 | 0 | 8 | 2 | 10 |
| | 12PM | 0 | 2 | 2 | 13 | 5 | 15 |
| | 4PM | 0 | 12 | 5 | 15 | 16 | 18 |
| 6-Apr | 9AM | 20 | 27 | 30 | 33 | 49 | 55 |
| | 12PM | 20 | 27 | 30 | 34 | 49 | 56 |
| | 4PM | 18 | 9 | 11 | 15 | 18 | 12 |
| 7-Apr | 9AM | 22 | 17 | 22 | 20 | 26 | 19 |
| | 12PM | 22 | 18 | 24 | 22 | 26 | 20 |
| | 4PM | 22 | 20 | 27 | 25 | 29 | 25 |
| 8-Apr | 9AM | 24 | 24 | 30 | 27 | 32 | 31 |
| | 12PM | 24 | 24 | 30 | 27 | 32 | 32 |
| | 4PM | 23 | 25 | 27 | 30 | 29 | 33 |
| 9-Apr | 9AM | 25 | 30 | 34 | 36 | 39 | 48 |
| | 12PM | 24 | 30 | 32 | 37 | 37 | 49 |
| | 4PM | 24 | 31 | 31 | 38 | 36 | 53 |
| 10-Apr | 9AM | 26 | 34 | 38 | 48 | 56 | 65 |
| | 12PM | 26 | 34 | 38 | 48 | 56 | 65 |
| | 4PM | 5 | 15 | 7 | 16 | 5 | 14 |
| 13-Apr | 9AM | 25 | 39 | 36 | 31 | 49 | 61 |
| | 12PM | 25 | 40 | 36 | 32 | 49 | 62 |
| | 4PM | 24 | 15 | 13 | 15 | 39 | 19 |
| 14-Apr | 9AM | 25 | 19 | 23 | 19 | 52 | 26 |
| | 12PM | 0 | 0 | 0 | 0 | 0 | 0 |
| | 4PM | 0 | 0 | 0 | 0 | 0 | 0 |

TABLE 5

Relative moisture content in soil from 3 inches or 9 inches below the soil surface after indicated treatment.

| | | Soil Oasis | | Irrigaid Gold | | Control | |
|---|---|---|---|---|---|---|---|
| Date | Time | Probe 1A | Probe 1B | Probe 2A | Probe 2B | Probe 3A | Probe 3B |
| 15-Apr | 9AM | 8 | 3 | 11 | 2 | 15 | 4 |
| | 12PM | 10 | 4 | 12 | 3 | 16 | 6 |
| | 4PM | 11 | 6 | 13 | 5 | 21 | 10 |
| 16-Apr | 9AM | 13 | 13 | 15 | 10 | 30 | 13 |
| | 12PM | 13 | 14 | 15 | 14 | 28 | 15 |
| | 4PM | 13 | 16 | 16 | 13 | 26 | 17 |
| 17-Apr | 9AM | 16 | 18 | 18 | 14 | 34 | 20 |
| | 12PM | 16 | 18 | 18 | 14 | 34 | 20 |
| | 4PM | 16 | 20 | 18 | 17 | 33 | 24 |
| 20-Apr | 9AM | 23 | 33 | 30 | 26 | 76 | 66 |
| | 12PM | 23 | 34 | 29 | 27 | 75 | 68 |
| | 4PM | 23 | 36 | 30 | 28 | 74 | 69 |
| 21-Apr | 9AM | 25 | 39 | 33 | 31 | 78 | 76 |
| | 12PM | 25 | 41 | 31 | 33 | 78 | 77 |
| | 4PM | 25 | 42 | 32 | 39 | 79 | 78 |
| 22-Apr | 9AM | 27 | 45 | 35 | 47 | 84 | 79 |
| | 12PM | 27 | 46 | 37 | 48 | 89 | 80 |
| | 4PM | 28 | 50 | 38 | 49 | 91 | 81 |
| 23-Apr | 9AM | 30 | 55 | 42 | 50 | 109 | 83 |
| | 12PM | 29 | 56 | 42 | 51 | 105 | 83 |
| | 4PM | 30 | 58 | 45 | 57 | 109 | 85 |
| 24-Apr | 9AM | 31 | 65 | 48 | 62 | 112 | 87 |
| | 12PM | 32 | 65 | 49 | 63 | 115 | 89 |
| | 4PM | 32 | 66 | 50 | 65 | 116 | 91 |

TABLE 6

Relative moisture content in soil from 3 inches or 9 inches below the soil surface after indicated treatment.

| | | Soil Oasis | | Irrigaid Gold | | Control | |
|---|---|---|---|---|---|---|---|
| Date | Time | Probe 1A | Probe 1B | Probe 2A | Probe 2B | Probe 3A | Probe 3B |
| 28-Apr | 9AM | 37 | 91 | 65 | 87 | 155 | 116 |
| | 12PM | 34 | 94 | 58 | 88 | 193 | 119 |
| | 4PM | 0 | 8 | 12 | 10 | 15 | 5 |
| 29-Apr | 9AM | 5 | 10 | 18 | 19 | 25 | 24 |
| | 12PM | 6 | 15 | 19 | 20 | 24 | 26 |
| | 4PM | 6 | 18 | 19 | 22 | 24 | 27 |
| 30-Apr | 9AM | 19 | 22 | 27 | 25 | 34 | 37 |
| | 12PM | 20 | 23 | 26 | 26 | 32 | 39 |
| | 4PM | 20 | 24 | 24 | 26 | 31 | 40 |
| 1-May | 9AM | 26 | 29 | 33 | 33 | 55 | 58 |
| | 12PM | 27 | 29 | 34 | 34 | 59 | 62 |
| | 4PM | 28 | 30 | 36 | 36 | 65 | 70 |
| 4-May | 9AM | 40 | 74 | 27 | 25 | 34 | 37 |
| | 12PM | 40 | 75 | 26 | 26 | 32 | 39 |
| | 4PM | 40 | 75 | 24 | 26 | 31 | 40 |
| 5-May | 9AM | 41 | 81 | 33 | 33 | 55 | 58 |
| | 12PM | 41 | 83 | 34 | 34 | 59 | 62 |
| | 4PM | 41 | 83 | 36 | 36 | 65 | 70 |
| 6-May | 9AM | 12 | 18 | 15 | 20 | 22 | 20 |
| | 12PM | 13 | 18 | 15 | 20 | 23 | 20 |
| | 4PM | 15 | 18 | 17 | 22 | 24 | 22 |
| 7-May | 9AM | 20 | 24 | 25 | 25 | 34 | 29 |
| | 12PM | 20 | 24 | 25 | 28 | 33 | 31 |
| | 4PM | 23 | 30 | 24 | 29 | 32 | 32 |

TABLE 7

Relative moisture content in soil from 3 inches or 9 inches below the soil surface after indicated treatment.

| | | Soil Oasis | | Irrigaid Gold | | Control | |
|---|---|---|---|---|---|---|---|
| Date | Time | Probe 1A | Probe 1B | Probe 2A | Probe 2B | Probe 3A | Probe 3B |
| 8-May | 9AM | 29 | 42 | 31 | 36 | 56 | 47 |
| | 12PM | 29 | 50 | 36 | 55 | 74 | 59 |
| | 4PM | 34 | 63 | 37 | 56 | 77 | 66 |
| 11-May | 9AM | 47 | 82 | 55 | 78 | 104 | 78 |
| | 12PM | 45 | 82 | 52 | 78 | 140 | 80 |
| | 4PM | 45 | 83 | 49 | 78 | 154 | 81 |
| 12-May | 9AM | 13 | 18 | 13 | 19 | 55 | 23 |
| | 12PM | 13 | 19 | 17 | 19 | 50 | 24 |
| | 4PM | 13 | 20 | 18 | 20 | 49 | 25 |
| 13-May | 9AM | 17 | 24 | 25 | 25 | 77 | 33 |
| | 12PM | | | | | | |
| | 4PM | | | | | | |

Figure 5:
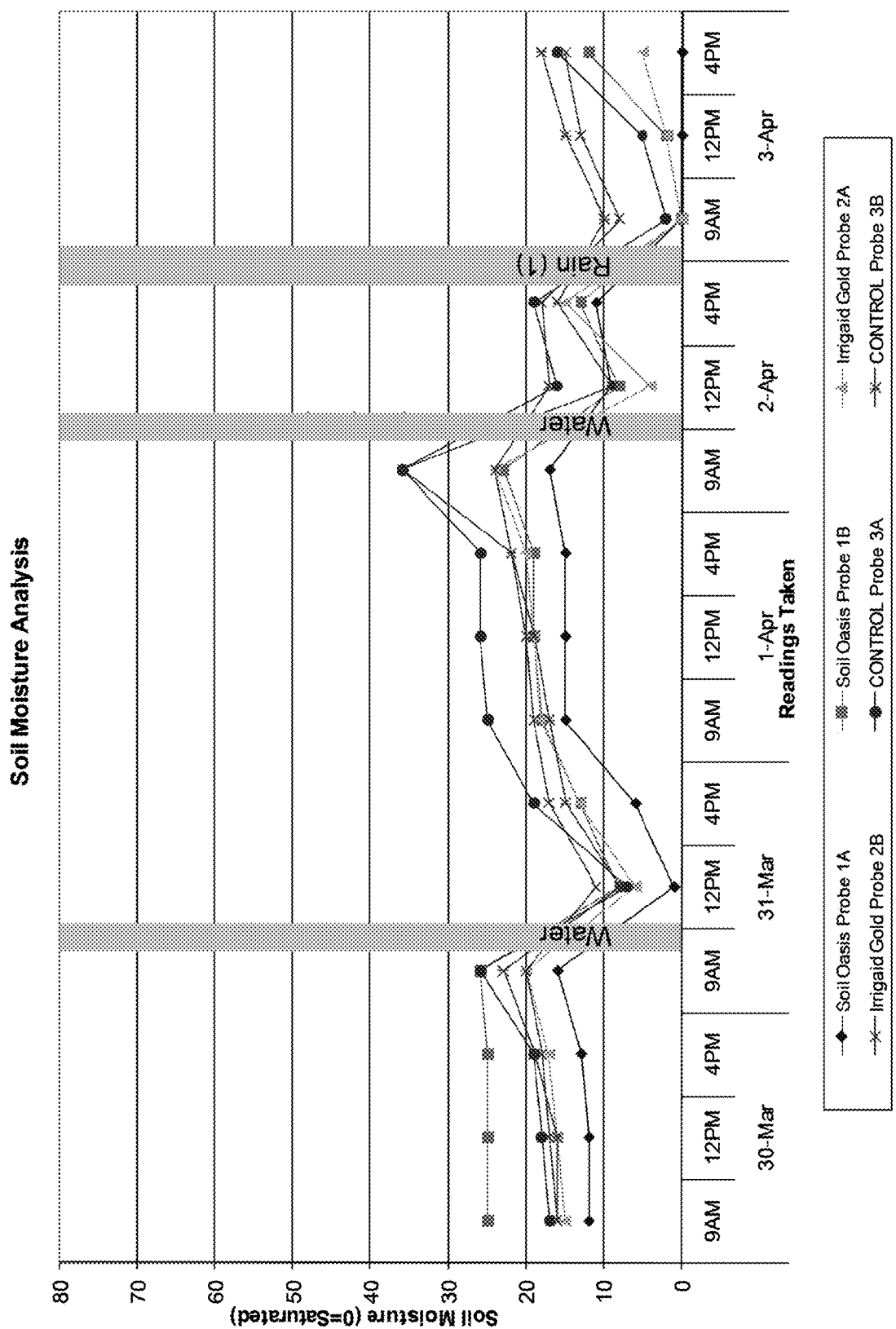
FIG. 5 is a soil moisture analysis graphs showing soil moisture as a function of time for the second set of test days after application of the soil treatments. An embodiment of the present invention is designated under an internal brand identifier of "SOIL OASIS." Moisture readings were taken at 3" deep (♦) and 9" deep (■). IRRIGAID GOLD (a composition of alkoxylated polyols, glucoethers, and water, Aquatrols, Paulsboro, N.J.) was compared, with readings also at 3" deep (▲) and 9" deep (x). A water only control was used with readings at 3" deep (●) and 9" deep (*).
Figure 6:
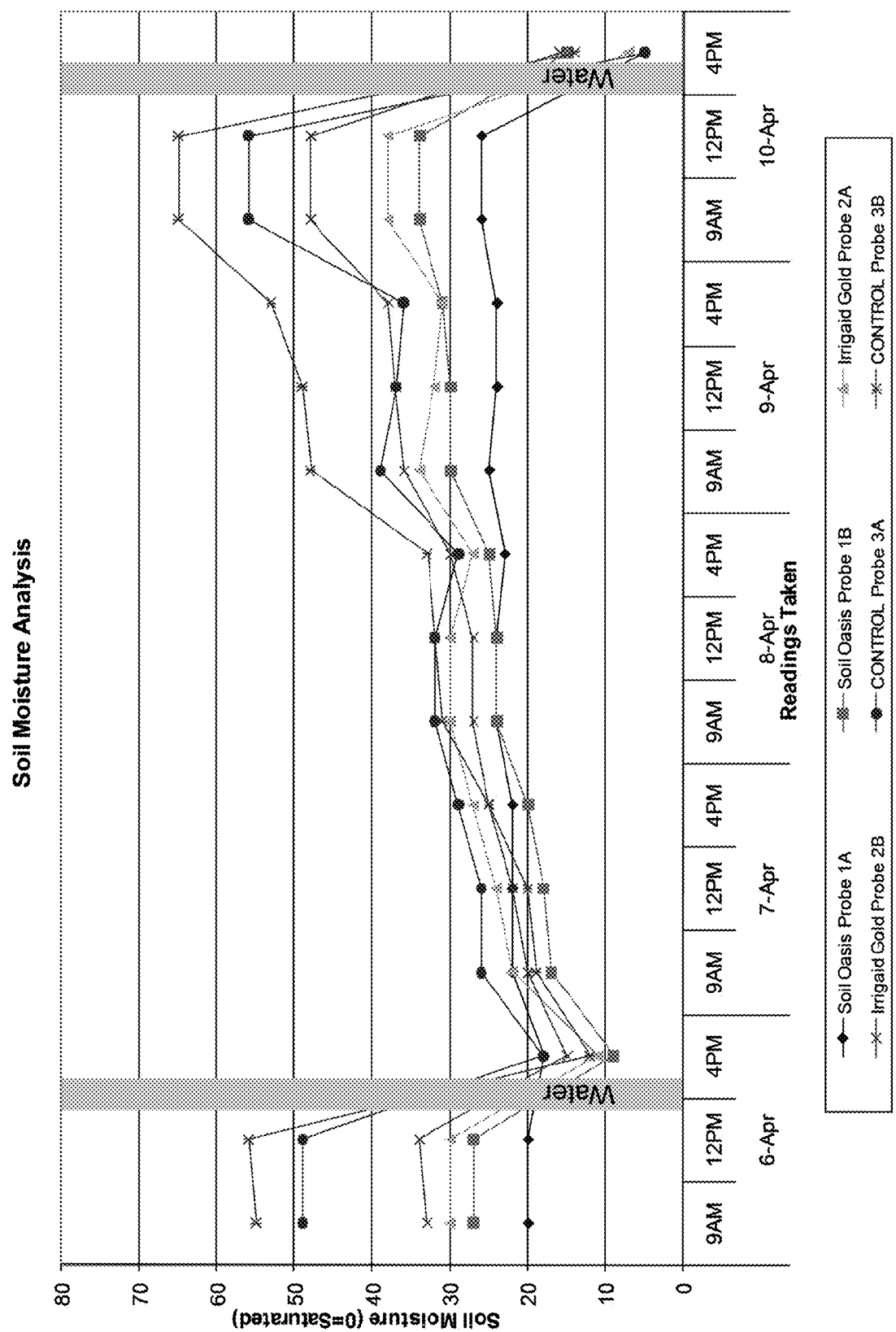
FIG. 6 is a soil moisture analysis graphs showing soil moisture as a function of time for the third set of test days after application of the soil treatments. An embodiment of the present invention is designated under an internal brand identifier of "SOIL OASIS." Moisture readings were taken at 3" deep (♦) and 9" deep (■). IRRIGAID GOLD (a composition of alkoxylated polyols, glucoethers, and water, Aquatrols, Paulsboro, N.J.) was compared, with readings also at 3" deep (▲) and 9" deep (x). A water only control was used with readings at 3" deep (●) and 9" deep (*).
Figure 7:
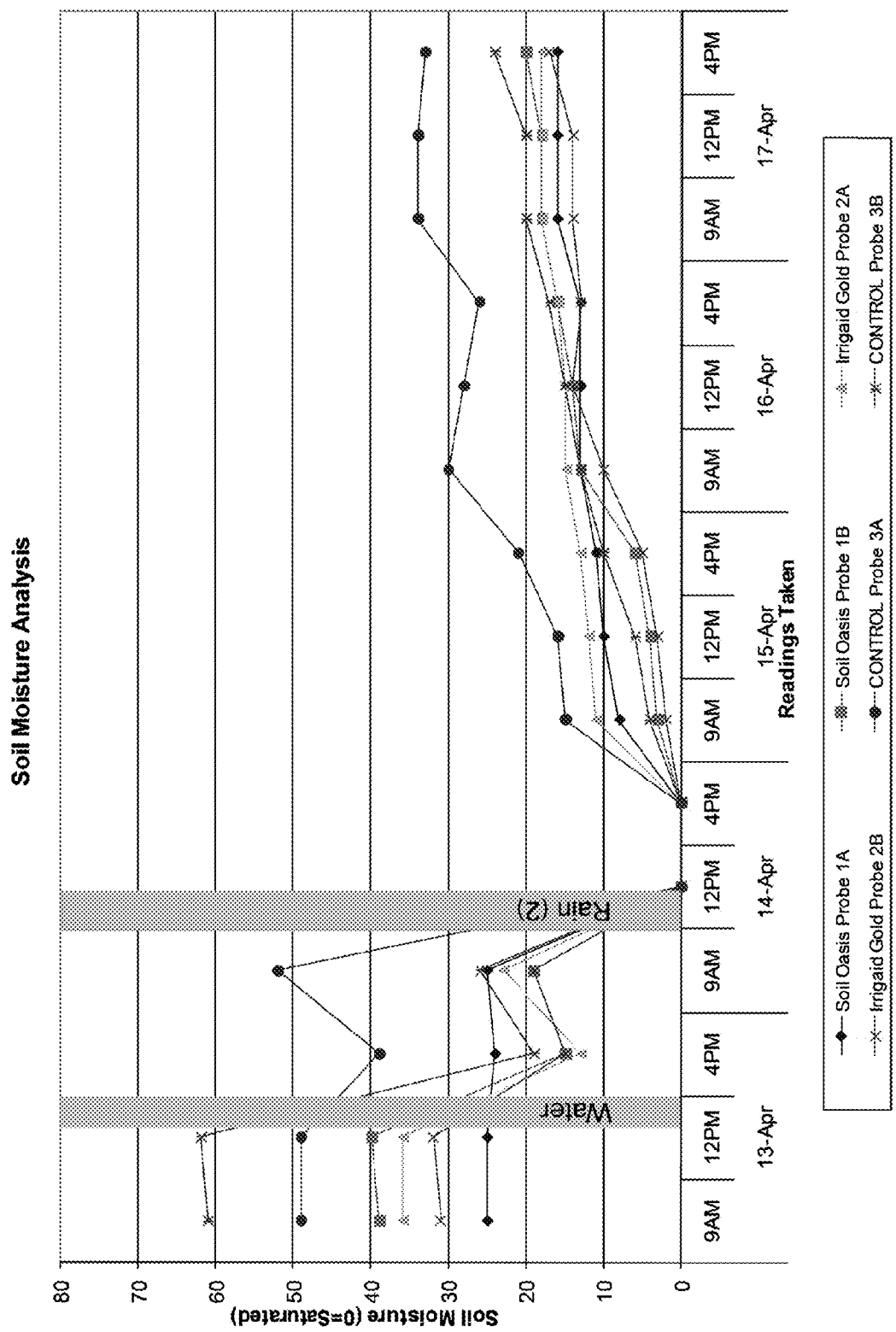
FIG. 7 is a soil moisture analysis graphs showing soil moisture as a function of time for the fourth set of test days after application of the soil treatments. An embodiment of the present invention is designated under an internal brand identifier of "SOIL OASIS." Moisture readings were taken at 3" deep (♦) and 9" deep (■). IRRIGAID GOLD (a composition of alkoxylated polyols, glucoethers, and water, Aquatrols, Paulsboro, N.J.) was compared, with readings also at 3" deep (▲) and 9" deep (x). A water only control was used with readings at 3" deep (●) and 9" deep (*).
Figure 8:
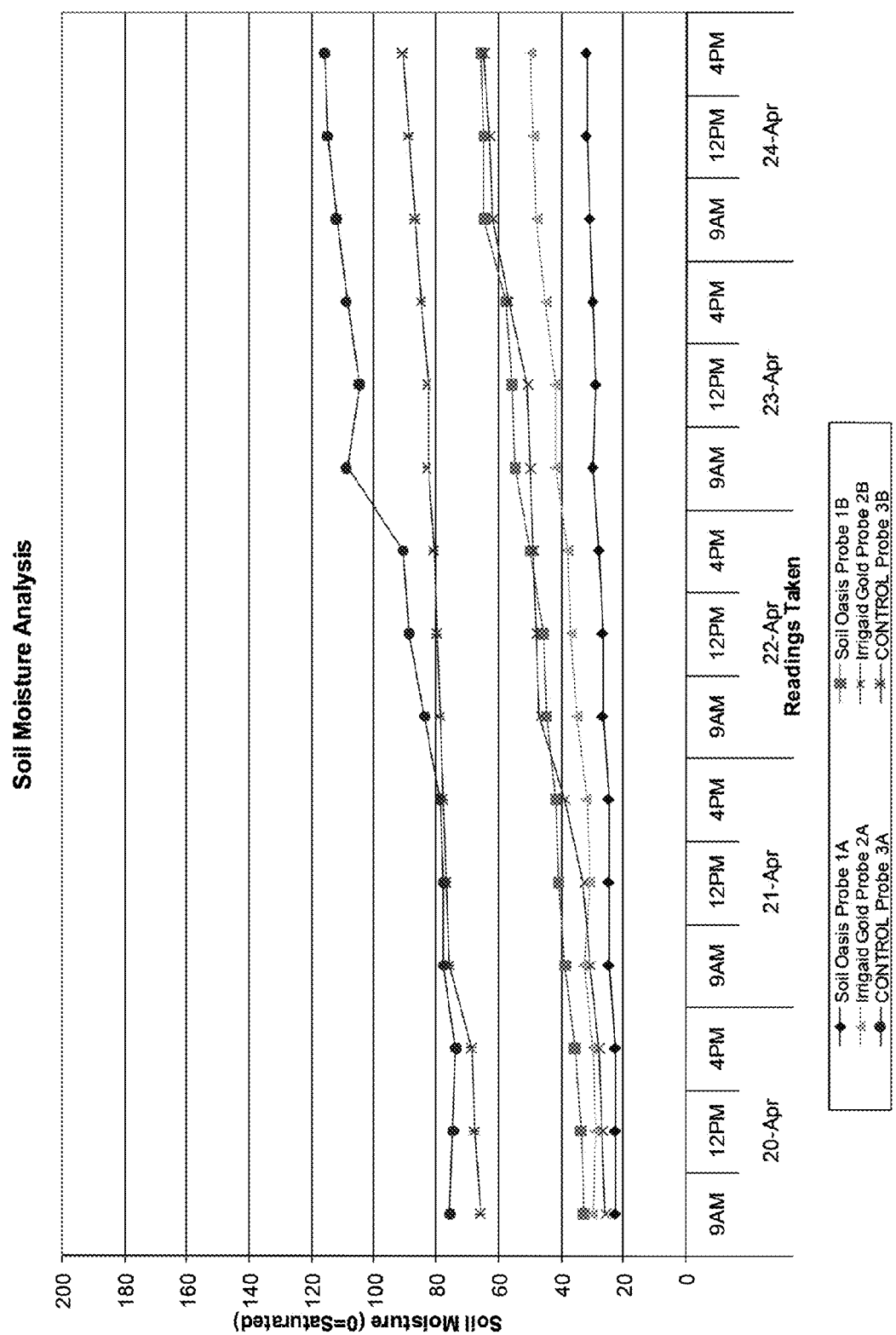
FIG. 8 is a soil moisture analysis graphs showing soil moisture as a function of time for the fifth set of test days after application of the soil treatments. An embodiment of the present invention is designated under an internal brand identifier of "SOIL OASIS." Moisture readings were taken at 3" deep (♦) and 9" deep (■). IRRIGAID GOLD (a composition of alkoxylated polyols, glucoethers, and water, Aquatrols, Paulsboro, N.J.) was compared, with readings also at 3" deep (▲) and 9" deep (x). A water only control was used with readings at 3" deep (●) and 9" deep (*).
Figure 9:
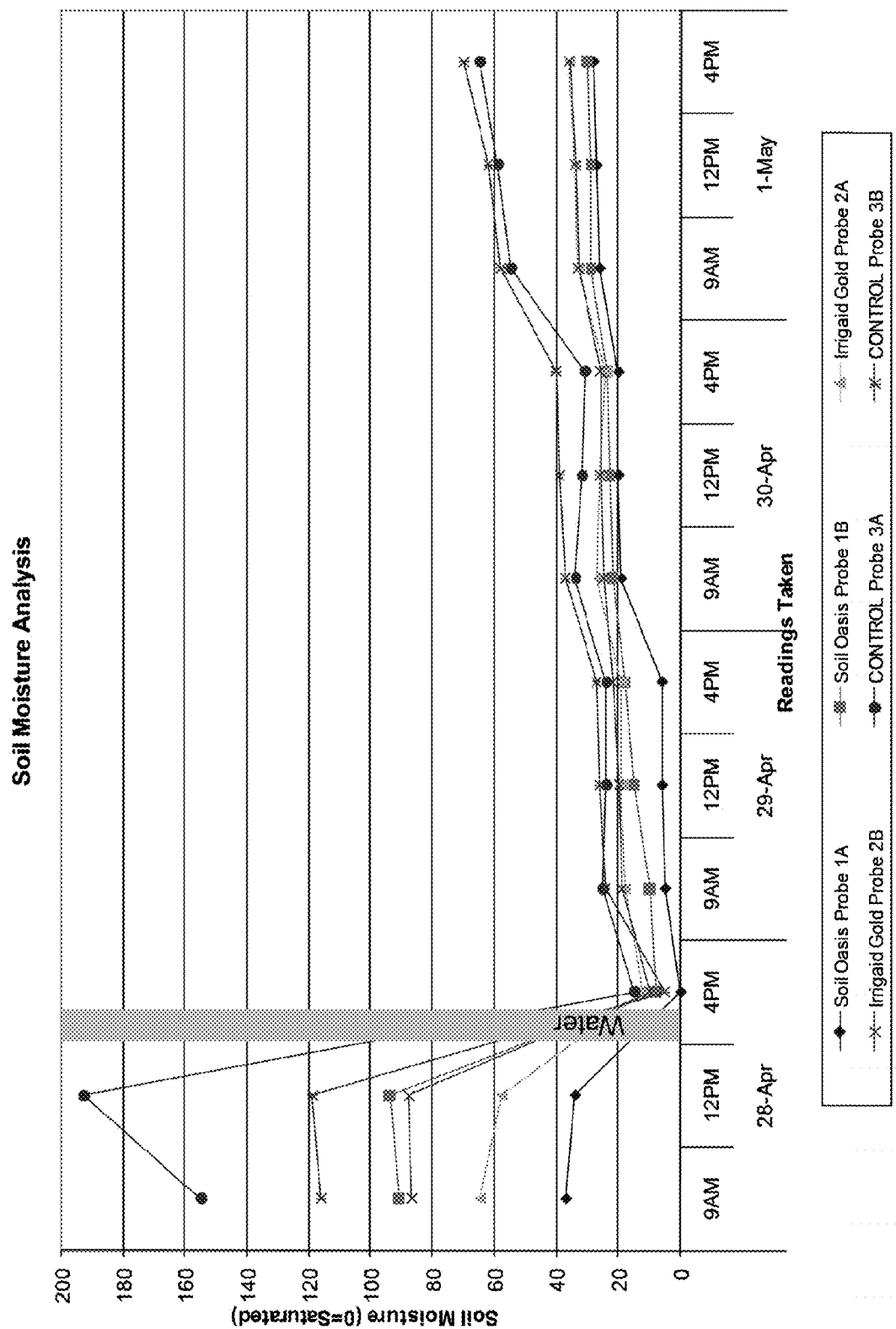
FIG. 9 is a soil moisture analysis graphs showing soil moisture as a function of time for the sixth set of test days after application of the soil treatments. An embodiment of the present invention is designated under an internal brand identifier of "SOIL OASIS." Moisture readings were taken at 3" deep (♦) and 9" deep (■). IRRIGAID GOLD (a composition of alkoxylated polyols, glucoethers, and water, Aquatrols, Paulsboro, N.J.) was compared, with readings also at 3" deep (▲) and 9" deep (x). A water only control was used with readings at 3" deep (●) and 9" deep (*).
Figure 10:
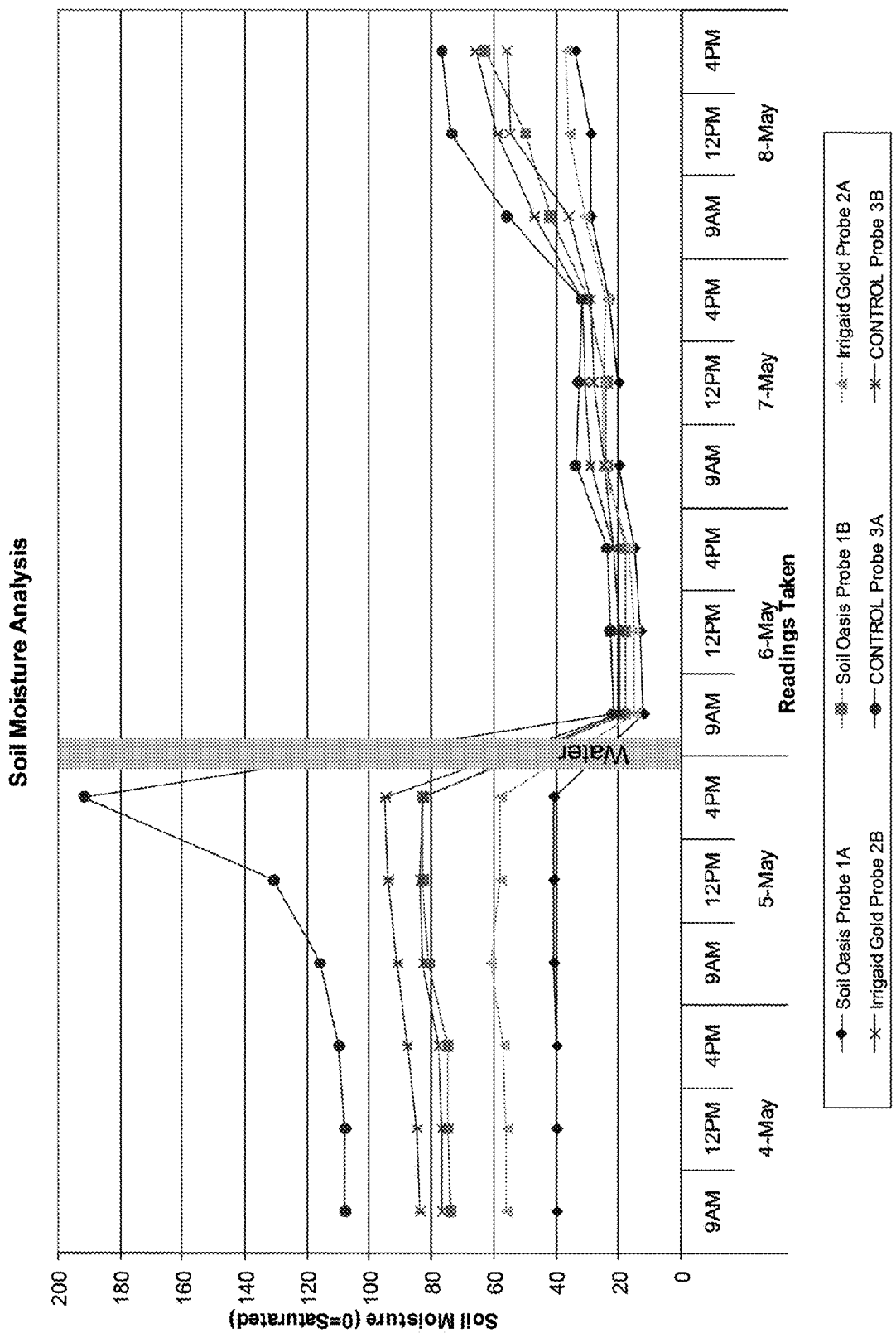
FIG. 10 is a soil moisture analysis graphs showing soil moisture as a function of time for the seventh set of test days after application of the soil treatments. An embodiment of the present invention is designated under an internal brand identifier of "SOIL OASIS." Moisture readings were taken at 3" deep (♦) and 9" deep (■). IRRIGAID GOLD (a composition of alkoxylated polyols, glucoethers, and water, Aquatrols, Paulsboro, N.J.) was compared, with readings also at 3" deep (▲) and 9" deep (x). A water only control was used with readings at 3" deep (●) and 9" deep (*).
Figure 11:
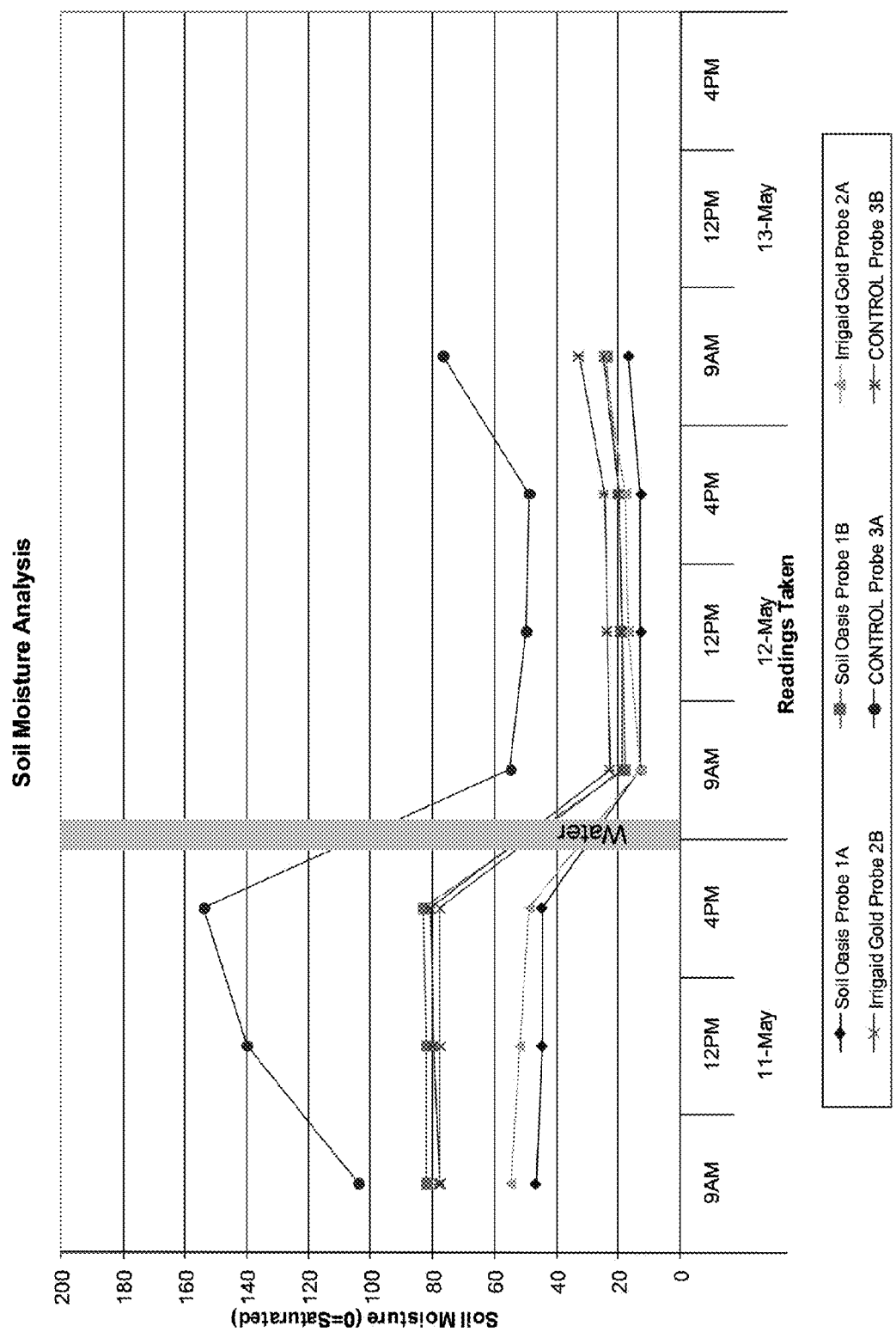
FIG. 11 is a soil moisture analysis graphs showing soil moisture as a function of time for the eighth set of test days after application of the soil treatments. An embodiment of the present invention is designated under an internal brand identifier of "SOIL OASIS." Moisture readings were taken at 3" deep (♦) and 9" deep (■). IRRIGAID GOLD (a composition of alkoxylated polyols, glucoethers, and water, Aquatrols, Paulsboro, N.J.) was compared, with readings also at 3" deep (▲) and 9" deep (x). A water only control was used with readings at 3" deep (●) and 9" deep (*).
Figure 12:
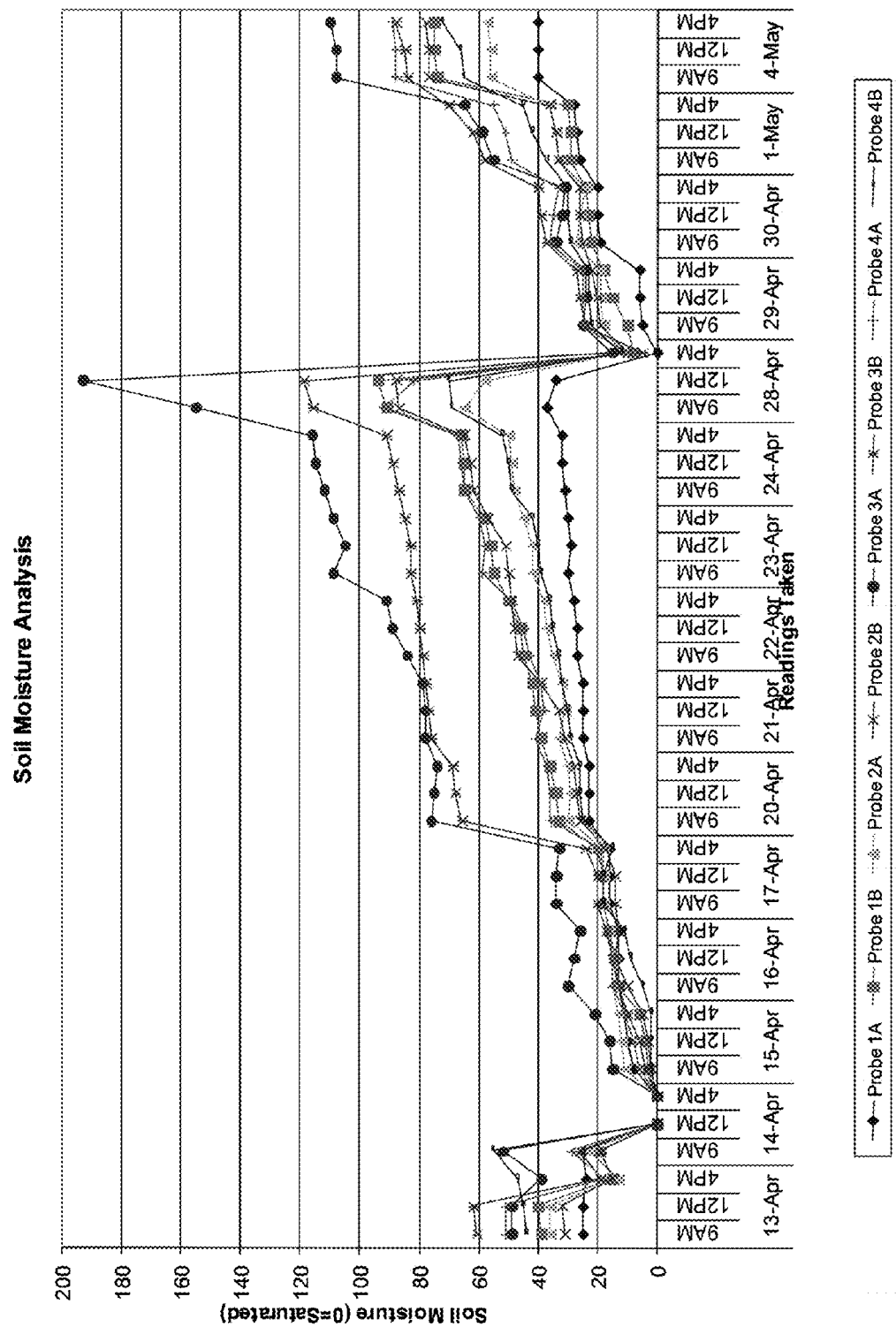
FIG. 12 is a soil moisture analysis graphs showing soil moisture as a function of time for the ninth set of test days after application of the soil treatments. An embodiment of the present invention is designated under an internal brand identifier of "SOIL OASIS." Moisture readings were taken at 3" deep (♦) and 9" deep (■). IRRIGAID GOLD (a composition of alkoxylated polyols, glucoethers, and water, Aquatrols, Paulsboro, N.J.) was compared, with readings also at 3" deep (▲) and 9" deep (x). A water only control was used with readings at 3" deep (●) and 9" deep (*).
Figure 13:
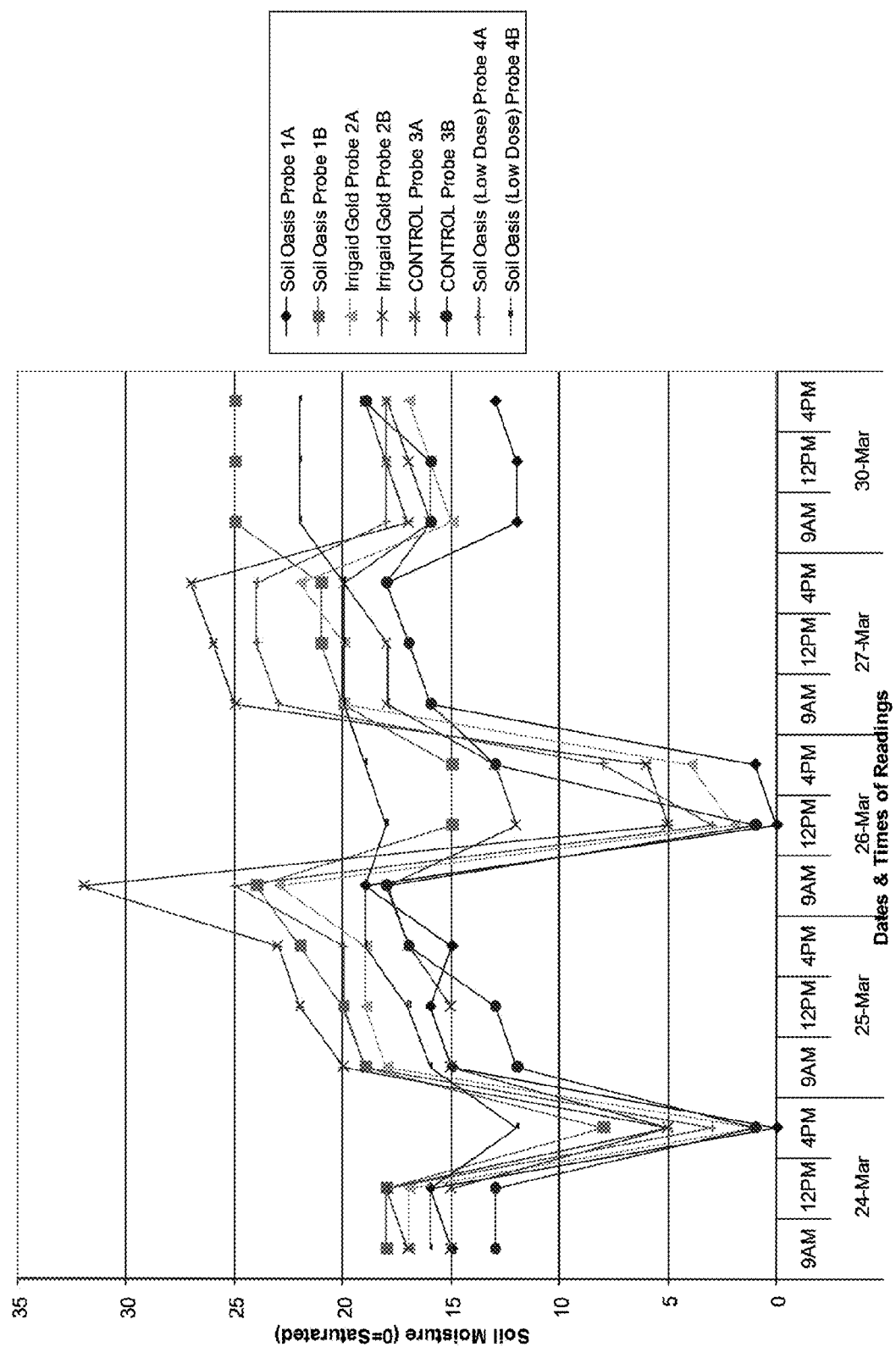
FIG. 13 is a soil moisture analysis graphs showing soil moisture as a function of time for the last few days of testing of the soil treatments. An embodiment of the present invention is designated under an internal brand identifier of "SOIL OASIS." Moisture readings were taken at 3" deep (♦) and 9" deep (■). IRRIGAID GOLD (a composition of alkoxylated polyols, glucoethers, and water, Aquatrols, Paulsboro, N.J.) was compared, with readings also at 3" deep (▲) and 9" deep (x). A water only control was used with readings at 3" deep (●) and 9" deep (*).

FIGS. 4-13 demonstrate substantial efficacy from an embodiment of the present invention. An embodiment of the invention composition was designated under an internal brand identifier of "SOIL OASIS," and was compared to IRRIGAID GOLD (a composition of alkoxylated polyols, glucoethers, and water, Aquatrols, Paulsboro, N.J.) and a water only control. The "treatment", indicated on FIG. 4, included 1000 ml of SOIL OASIS (2.2 gm/ml), 1000 ml of IRRIGAID GOLD (a composition of alkoxylated polyols, glucoethers, and water, Aquatrols, Paulsboro, N.J.) (1.9 gm/ml), or 2000 ml of water for the control. Regular watering events, labeled "Water", included 1000 ml of water on the treated plants (SOIL OASIS or IRRIGAID GOLD, a composition of alkoxylated polyols, glucoethers, and water, Aquatrols, Paulsboro, N.J.) and 2000 ml of water on the control. Rain events were also recorded, labeled "Rain" on FIGS. 5, 7, with an event identifier. In FIG. 5, Rain 1 was recorded as 25 inches of rainfall overnight and ending at 9 AM. In FIG. 7, Rain 2 was recorded at 1.25 inches of rainfall between 9:30 AM and 3:45 PM. The inventive composition shows enhanced water retention in the upper soil, with little moisture retention below the settling location of the composition throughout the tests. Further, extended use of the composition for three months does not show a breakdown of the composition upon repeated waterings.

Example 2

A 35 acre test field was identified in Plant City, Fla. that had continually inconsistent crop production due to dramatic changes in soil types from pure sand to loam, to heavy loam. The moisture and nutrient balance that is good for loamy soils is too dry and nutrient deficient for sandy soils, and causes too much moisture and nutrients to be present in very loamy areas. Because of these different types of soils the farmer has always been challenged in maintaining optimum nutrient and moisture levels. Because input costs are the same, (cost per acre for land prep, plants, water, pesticide sprays & fertilizer), inconsistence production is very costly to farmers.

A concentrate of 1 part MASURF SP-1020 (a functionalized ampholytic polymer, Mason Chemical Company, Arlington Heights, Ill.) to 1.424 parts of MASURF 916M (alcohols, C9-16, ethers with polyethylene glycol mono-Me ether, Mason Chemical Company, Arlington Heights, Ill.) was added to irrigation water at a rate of ¾ gallon to the acre on a strawberry field at the beginning of the season. No other changes in their growing practices that had been used in years earlier. Early in to the production cycle, plants and fruit on the plants treated with the composition looked much more consistent across the entire crop, as compared to crops not treated with the composition. Estimates from the farmer showed that by the end of the growing cycle 30-35% more strawberries were collected than crops from any of the previous 15 years, without treatment of the composition. The consistency in crop yields throughout the field were enhanced, and the farmer noted a better overall yield per plant.

Example 3

Two 9-acre tracts in Plant City, Fla. were used to test the effect of the inventive composition on peppers. For 3 days, starting February 18$^{th}$, peppers were planted in the two tracts of land. On March 24th the inventive composition was introduced to one of the 9-acre blocks thru the existing fertilizer venturi feed system at a rate of ¾ gallon to the acre. After the injection was complete the system was let run an additional 45 minutes to make certain that the chemical was flushed into the soil, and that approx 30 minutes of clean water was added to insure that the chemical was well soaked into the bed. The other 9 acre tract was watered the same amount, but without the inventive composition being added, ensuring that both tracts received the same amount of water.

Approx 2 hours later it was becoming visually obvious that the tract treated with inventive composition was holding moisture in the top 6 to 7 inches of the soil and had better lateral moisture while the non treated tract had areas where the moisture had already reached the bottom of the bed. After seven weeks, the treated tract appeared to have twice the blooms and fruit set as the untreated tract. At week eleven it was confirmed that the yield per picking from the block treated with the inventive composition had twice the yield as the untreated tract. This higher yield stayed consistent (twice the amount of fruit) throughout the remaining growing cycle.

Because the inventive composition supports both nutrient retention in the upper profiles of the soil columns as well as moisture retention in the same area of the soil, the crops received more usable nutrients and moisture. The soils in this example were primarily sand and sandy loam, with a high tendency for rapid perculation. The inventive composition provides a soil stabilizer that holds both the added nutrients (fertilizers) as well as moisture in the area of the bed in a manner that allows the plant to uptake these constituents in a manner that optimizes the plant growth. This is accomplished thru "self-assembling nano-composite" technology via the polymers that are ampholytic and do not disrupt the natural bioics of the plants in any manner, resulting in much higher crop yield with the same amount of water and fertilizer over the course of the crop grow time.

Example 4

The inventive composition is also very effective on elimination of transplantation stress caused when large field grown trees are dug and usually burlap wrapped for shipment, or when container grown plants are removed from their grow container and planted in a new soil environment. The stresses can range from mild wilting to leaf drop to total loss of the plant. One ounce of the concentrated composition described above is added to one gallon for use on container plants being readied for shipment and installation to new soil environment. For dug and or dug/burlap plants being readied for shipment and installation, 2 ounces of composition were added to one gallon prior to transplant to a new soil environment.

A shipment of trees and bushes from Palmetto, Fla. were transported to a trade show in Central Texas from August 7 to Aug. 12, 2009 via an open flat bed trailer. Typically, such shipments result in extensive stress to the plants, even if the plants are drenched with water before being loaded, and loss of some of the shipment.

Five ounces of the inventive composition were added to 5 gallons of water and the plants drenched completely. The transportation of plants to Texas typically requires 3 days, while this particular trip took 4 days to arrive, a 25% increase in travel time. Additionally, the daily temperatures ran up to 105° F. which is unusually high for that time of year. Despite the high temperatures and additional travel time, all the plants unexpectedly appeared healthy upon arrival. The plants were watered on the day of arrival, and did not require additional watering until August 16$^{th}$, evidencing the unexpectedly enhanced water retention of the inventive composition.

The compositions described herein enhance transplant stress tolerance by maintaining and preserving, at a molecular level, the moisture binding capillary structure at the root zone plant surfaces and near-root soil, retaining moisture and maintains root pressure and maintaining an intact hydrated osmotic root zone environment thereby allowing the transplant to more efficiently achieve equilibrium with its new natural environment. By maintaining a hydrophilic and hydrated biotic root zone environment, the surviving root system of the transplant is more resistant to desiccation and resulting osmotic stress. The combined benefits from treatment using the inventive compositions reduces transplant stress, increases transplant stress tolerance, by forming a protective shield of moisture and nutrient releasing hydration. By mimicking the pre-transplant biomass partitioning between roots and shoots through Grower's Edge treatment, the transplant is better able to resist desiccation and respond quicker to the natural post-transplant environment.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a composition and method for treatment of soil, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:

1. A method of treating soil, comprising
applying a composition to soil, wherein the composition comprises
an ampholytic copolymer formed from at least two monomer components or an ampholytic polymer formed from at least three monomer components, wherein the monomer components comprise:
monomer component (a), having formula (I)

$$H_2C=CR^1-CO-NH-R^2-N^+R^3R^4R^5X^- \quad (I)$$

wherein $R^1$ is H or an alkyl radical with 1 to 4 C atoms;
wherein $R^2$ is a linear or branched alkylene radical with 1 to 12 C atoms;
wherein $R^3$, $R^4$ and $R^5$ is H, an alkyl radical with 1 to 18 C atoms, or a phenyl radical, independently;
wherein X is an anion selected from the group consisting of halogen, sulfate, alkylsulfate, hydroxide, phosphate, acetate, and formate;
monomer component (b), having formula (II)

$$H_2C=CR^6-CO-NR^7R^8 \quad (II)$$

wherein $R^6$ is hydrogen or an alkyl radical with 1 to 4 C atoms;
wherein $R^7$ and $R^8$ are H, an alkyl radical with 1 to 4 C atoms or a C3-C6 cycloalkyl radical, independently;
where $R^7$ and $R^8$ do not simultaneously represent hydrogen;
monomer component (c) being an ethylenically unsaturated acid;
monomer component (d) being selected from the group consisting of C3-C6 singly ethylenically unsaturated carboxylic acid, a half-ester of C3-C6 singly ethylenically unsaturated carboxylic acid, a salt of C3-C6 singly ethylenically unsaturated carboxylic acid, crotonic acid, a salt of crotonic acid, $H_2C=CR-CO-NH-CR'R''-CR'R''SO_3H$, and salts thereof;
wherein R, R', and R'' are H or an alkyl(ene) radical with 1 to 4 C atoms, independently; or
monomer component (e) being selected from the group consisting of 2-dimethylaminoethyl(meth)acrylate, 2-diethylamino-ethyl(meth)acrylate, 3-dimethylaminopropyl(meth)acrylamide, 3-dimethyl-amino-2,2-dimethylpropylacrylamide, derivatives thereof, 2-trimethyl-ammoniumethyl(meth)acrylate chloride, 3-diethylmethylammoniumpropyl-acrylamide chloride, and dimethyl diallylammonium chloride; and
a non-ionic, hydrophilic ethoxylated alcohol surfactant.

2. The method of treating soil of claim 1, wherein the monomer components of the copolymer or ampholytic polymer are
ethanaminium, N,N,N-trimethyl-2-[(2-methyl-1-oxo-2-propen-1-yl)oxy]-, chloride, 2-propenamide and 2-propenoic acid;
sodium acrylate, ethylacrylate, and trimethylammoniopropylmethacrylamide;
2-acryloamido-2-methyl-1-propanesulfonic acid-acrylic acid-N-isopropylacrylamide-trimethyl(3-methacrylamido-propyl)ammonium chloride;
diallyl dimethyl ammonium acrylamide and acrylic acid;
acrylic acid, dimethyldiallylammonium chloride and acrylamide;
acrylic acid and diallyldimethylammonium chloride; or
acrylic acid, methacrylamido propyl trimethyl ammonium chloride, and methyl methacrylate.

3. The method of treating soil of claim 1, wherein the non-ionic surfactant is:
a composition of alcohols, C9-16, ethers with polyethylene glycol mono-Me ether; or
a composition of alcohol ethoxylates.

4. The method of treating soil of claim 1, further comprising adding a wetting agent to the composition.

5. The method of treating soil of claim 1, wherein the composition is 1 part of a polymer comprising a polymer of ethanaminium, N,N,N-trimethyl-2-[(2-methyl-1-oxo-2-propen-1-yl)oxy]-, chloride, 2-propenamide and 2-propenoic acid to 1.424 parts of a composition of alcohols, C9-16, ethers with polyethylene glycol mono-Me ether.

6. The method of claim 1, further comprising applying the composition through an irrigation system.

7. The method of claim 6, wherein the composition is added at between ½ gallon to the acre and 1 gallon to the acre.

8. The method of claim 6, further comprising
running the composition through the irrigation system for about 45 minutes; and
running clean water through the irrigation system for about 30 minutes after the composition is run through the system.

9. The method of claim 1, further comprising
diluting the composition at 1 gallon to 1450 gallon to 1 gallon to 500 gallon; and
drenching the soil with the diluted composition.

10. The method of claim 1, further comprising
diluting 1 ounce of the composition in one gallon of water or 2 ounces of composition in one gallon of water;
applying the diluted composition to a root ball of a plant or containered plant.

11. The method of claim 1, wherein the monomer component (d) is $H_2C=CH-CO-NH-C(CH_3)_2-CH_2-SO_3H$.

\* \* \* \* \*